US006772702B2

(12) United States Patent
Lee et al.

(10) Patent No.: US 6,772,702 B2
(45) Date of Patent: Aug. 10, 2004

(54) LOCKDOWN AND SUPPORT STRUCTURE FOR AGRICULTURAL PARTICULATE TANK

(75) Inventors: Laurence K. Lee, Darien, IL (US); Guntis Ozers, Woodridge, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/101,874

(22) Filed: Mar. 21, 2002

(65) Prior Publication Data

US 2003/0177965 A1 Sep. 25, 2003

(51) Int. Cl.[7] .......................... A01C 23/00; A01C 7/18
(52) U.S. Cl. .................. 111/174; 111/118; 111/925; 220/562; 220/475
(58) Field of Search ............................ 111/56, 63, 174, 111/925; 220/4.12, 4.13, 475, 482, 756, 562; 248/671, 674, 675, 676, 118, 118.1, 118.3, 274.1, 295.11, 298.1, 129, 200

(56) References Cited

U.S. PATENT DOCUMENTS

| | | | |
|---|---|---|---|
| 4,715,515 A | * 12/1987 | Steilen | 222/143 |
| 4,756,425 A | * 7/1988 | Wise | 206/596 |
| 5,161,473 A | 11/1992 | Landphair et al. | 111/176 |
| 5,379,706 A | 1/1995 | Gage et al. | 111/175 |
| 6,047,652 A | * 4/2000 | Prairie et al. | 111/174 |

FOREIGN PATENT DOCUMENTS

| | | | |
|---|---|---|---|
| EP | 0140260 | * | 5/1985 |
| EP | 0140262 A1 | * | 5/1985 |
| EP | 0338647 | * | 10/1989 |

* cited by examiner

Primary Examiner—Robert E. Pezzuto
Assistant Examiner—Nathan S Mammen
(74) Attorney, Agent, or Firm—Rebecca Henkel; Brant T. Maurer

(57) ABSTRACT

An apparatus for use with a planting assembly including a mounting member and comprising a hopper including first and second wall members that form first and second hopper external surfaces wherein first and second forces applied perpendicular to the first and second surfaces include at least components along first and second opposing trajectories, respectively, a first elongated bearing member rigidly linked to the mounting member and forming a first bearing surface that applies a first applied force to the first hopper surface wherein the first applied force includes at least a first compressing component along the first trajectory, a second elongated bearing member forming a second bearing surface and having a first end and a retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory.

21 Claims, 15 Drawing Sheets

LOCKDOWN AND SUPPORT STRUCTURE FOR AGRICULTURAL PARTICULATE TANK

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is related generally to agricultural implements and more specifically to an improved supporting and locking assembly for securing irregularly shaped particulate hoppers to transport assemblies.

BACKGROUND OF THE INVENTION

In the past, distribution of seed (or other particulate material such as fertilizer) for use in a variety of agricultural operations has been facilitated via a planter apparatus including a wheel supported carrier frame having a hitch for linking to a tractor or other prime mover, an implement bar mounted to the frame perpendicular to the transport direction and a plurality of row units (e.g., 8 to 32) mounted to and essentially equi-spaced along the length of the implement bar. Among other components, each row unit typically includes some type of seed bin that opens downwardly into a dispenser assembly and some type of soil agitator (e.g., a coulter or knife member) juxtaposed on the transport side of the dispenser. During transport through a field the agitator is forced through soil there below and forms a seed trench. As its label implies, the dispenser dispenses a pre-selected quantity of seed downward and behind the agitator into the trench.

The individual seed bins generally have limited storage capacity. For instance, many row unit seed bins are limited to between one and three bushel volumes. For this reason, these types of planter assemblies required frequent bin refilling. Unfortunately, seed filling stations (e.g., typically a barn or other storage unit) are typically stationary and therefore filling exercises often required a trip out of the fields back to a station and then a trip back to the fields to continue the seeding process. These filling trips increased the overall time required to plant fields. In addition to the round trip time required to refill bins, the refilling process itself was tedious as each separate row unit bin had to be filled during each filling exercise.

In an effort to reduce the number of seed refilling exercises required to seed a field, the industry has developed systems including one or more large seed reservoir hoppers mounted to the carrier frame that are transported along with the row units. In an exemplary system, a main hopper dispenses seed to a plurality of individual mini-hoppers that each, in turn, supply seed to an individual row unit. To this end, the main hopper will typically form an upwardly opening cavity and will form, among other surfaces, bottom cavity surfaces that slope downward toward an outlet port in the bottom of the hopper. The seed may be fed from the main hopper's outlet port into each mini-hopper by, for instance, entraining the seed in an air stream contained in separate, individual seed transfer hoses that are connected between the main tank and each of the individual mini-hoppers.

When designing agricultural equipment weight should be minimized to increase transport efficiency. In addition, equipment should always be designed to minimize required maintenance. Moreover, the equipment should be designed to facilitate easy configuration set up and deployment. Furthermore, as with virtually all products, manufacturing and product costs should be minimized whenever possible.

One manufacturing process that has been widely accepted for producing general purpose light weight, rugged and relatively inexpensive containers has been the rotational molding process. To form a container using a rotational molding process, the internal surfaces of a multipart metallic mold are coated with an anti-stick spray and then plastic particulate is placed inside a cavity formed by a first part of a multipart metallic mold. Thereafter other parts of the mold are secured to the first part to form a completely enclosed cavity including the particulate where the internal surface of the closed mold defines an external surface of a container to be produced. Next, the mold is heated to melt the particulate and the mold is rotated about several axis to distribute the melted particulate across the entire internal surface of the mold.

After completely covering the internal surface with melted particulate the mold is cooled and, as the mold cools, the particulate hardens to form the container. To expedite the cooling process, hot molds are often placed within cooling rooms where large fans or other types of cooling units blow cool air across the external surfaces of the molds. After cooling, when the mold is opened the container is removed and may be further processed in any of several different ways. For instance, in some cases the container may be cut in half to form a two piece container.

Because rotational molding processes are relatively inexpensive to perform and provide rugged, light weight, minimal component and often complex containers (e.g., hopper containers including variously sloped internal surfaces), rotational molding processes would appear to be nearly ideal for manufacturing main hoppers for use with planter assemblies like the assembly described above.

Unfortunately, in the case of typical rotational molding processes there are several sources or error that render it difficult to meet precise tolerances. In particular, it has been recognized that as molded containers cool, often the containers will shrink or become otherwise somewhat distorted. While shrinkage would not be problematic if the amount of shrinkage were uniform throughout a container and could be controlled, in reality shrinkage is difficult at best to control or predict.

To this end, for instance, differing cooling environments can cause similarly molded containers to have different shrinkage characteristics. For example, where first and second molds are placed in a cooling room with a fan directed at the first mold and another fan only indirectly blowing air toward the second mold, the shrinkage characteristics can be different.

As another instance, while mold rotation is attempted to evenly distribute melted particulate across the internal surfaces of the molds sometimes distribution is uneven so that one container wall or wall section is thicker than an adjacent wall or section. In these cases, during cooling the container shape can be distorted somewhat as differently thick sections are often characterized by different cooling and shrinking characteristics. Thus, where a stiff container section is proximate a relatively thin container section the thin section may shrink more than the thick section and may be caused to distort or slightly curl about the thicker section.

As one other instance, sometimes the anti-stick spray is not evenly distributed on the internal surfaces of the mold sections so that during cooling some sections of the container may stick to the mold while other sections of the container come unstuck. Again, as in the case where particulate is unevenly distributed, some sections of the container will shrink and distort to a greater degree than other adjacent sections.

While these distortions and different shrinkage characteristics are minimal in the case of small rotational containers, unfortunately the variances become greater as the size of the container is increased. In particular, in the case of agricultural main hoppers like the ones described above where a hopper may be as large as several bushels (e.g., 30–40 bushels), the differing shrinkage and distortion characteristics may amount to as much as several inches of hopper dimension variance. For instance, where a hopper includes front and back walls, the dimension between the external surfaces of the front and back walls may vary within a range of several inches (e.g., 3–4).

One problem with hoppers having dimension variances within several inch ranges is devising a mechanism to secure such hoppers to planter transport equipment such as a wheel supported carrier frame. Generally rigid mechanical solutions for securing the hoppers to a carrier frame do not work as the variable dimensions typically cause mechanical components to misalign. For instance, assume that both the front and back ends of a hopper have to be secured to the carrier frame to provide a completely stable hopper and that the front end is bolted to the carrier frame. In this case the back end may or may not be aligned with apertures for receiving a bolt to secure the back end.

Thus, most workable hopper securing mechanisms have abandoned rigid mechanical solutions and instead have adopted strap or belt type solutions. For instance, in an exemplary belt type solution a hopper is supported in a support cradle that extends up from a carrier frame and two belt assemblies are used to secure the hopper to the support cradle. In this case each belt assembly includes two belt segments that are secured to opposite sides of the cradle with distal ends that extend up and around the top of the main hopper. The distal ends corresponding to the same belt are formed so that they can be secured together and so that the combined lengths of the corresponding belt assembly can be adjusted. Thus, importantly, because the combined lengths of each belt assembly are adjustable many different hopper dimensions can be accommodated and loose manufacturing tolerances can be tolerated.

Despite effectively securing imperfectly formed hoppers to carrier frames the belt type securing mechanisms have several shortcomings. First, such configurations require many components and therefore are relatively expensive. Second, these configurations are generally less robust than other types of rigid mechanical configurations and therefore require additional maintenance. Third, belt configurations are difficult to use. For instance, to strap a single main hopper to a support cradle, the hopper has to be positioned on the cradle, a user has to climb onto the planter assembly to access the top of the hopper, wrap a first end of a first belt around the top of the hopper, wrap a second end of the first belt around the top of the hopper and then fasten the first and second ends. Thereafter the user has to perform these tasks again, this time for the second belt assembly. Continuing, in some cases the user has to further tighten the first belt assembly and then further tighten the second assembly. This process has to be repeated for embodiments including additional hoppers.

Therefore, a need exists for a simple and inexpensive hopper support and lock down mechanism that can accommodate variously and irregularly sized hoppers.

BRIEF SUMMARY OF THE INVENTION

It has been recognized that a simple mechanical clamping apparatus can be configured that can compensate for imperfectly formed main hoppers having a relatively wide range of dimensions that should include essentially all of the likely hopper dimensions that will result from using a rotational molding process to manufacture hoppers. To this end, the clamping apparatus in some embodiments includes a system that restrains both vertical and horizontal hopper motion by providing adjustable bearing members that clamp against opposite sides of the hopper and apply a compressing force and perhaps also oppositely directed vertical forces. The adjustability of the clamping assembly accommodates variably sized hoppers.

Consistent with the above, the invention includes an apparatus for use with a planting assembly including a mounting member and a hopper, the hopper including first and second wall members that form first and second hopper external surfaces wherein first and second forces applied perpendicular to the first and second surfaces include at least components along first and second opposing trajectories, respectively, the apparatus for securing the hopper to the mounting member and comprising a first elongated bearing member linked to the mounting member and forming a first bearing surface that applies a first applied force to the first hopper surface wherein the first applied force includes at least a first compressing component along the first trajectory, a second elongated bearing member forming a second bearing surface and having a first end and a retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory.

In some embodiments the invention includes first and second coupler members and a retaining member, the first coupler member rigidly linked to the mounting member and including a first coupler surface that defines a plane that is substantially perpendicular to the first bearing surface, the second coupler member including a second coupler surface and rigidly secured to the first end of the second bearing surface, the retaining member for securing the second coupler surface parallel to and in any of several different positions with respect to the first coupler surface. More specifically, in some embodiments the first and second coupler members form first and second coupler apertures and the retaining member is receivable through the first and second coupler apertures to lock the first and second coupler members in at least one of the several different positions. Here, the retaining member may be a bolt and a nut where the bolt includes a shaft member and the shaft member is received through the apertures and the nut is received on the end of the shaft to lock the first and second coupler members in the at least one position. Here, the shaft may have a shaft cross section and at least one of the coupler apertures may have an aperture cross section that is substantially larger than the shaft cross section.

In some embodiments the first coupler aperture has an aperture cross section that is substantially larger than the shaft cross section and wherein the first coupler aperture is slot shaped having a first slot length. In addition, the second coupler aperture may be slot shaped having a second slot length. Moreover, the bolt and nut may secure the first and second coupler members together with the first and second slot length substantially perpendicular. Furthermore, one of the first and second slot lengths may be substantially parallel to the first trajectory. In addition, the first and second coupler apertures may comprise a first aperture pair and the first and second couplers also may form at least a second coupler aperture pair wherein the apparatus further includes a second retaining member receivable through the second aperture pair. Here, each of the retaining members may include a bolt having a shaft and a nut receivable on the shaft, each shaft may have a shaft cross section and each of the apertures may have a cross sectional area that is substantially greater than the shaft cross section. Also, here, each of the coupler apertures may be a slot having a slot length, the first coupler member slot lengths may be parallel and the second coupler slot lengths may be parallel and may be perpendicular to the first coupler member slot lengths.

In some embodiments the second bearing member includes a second end opposite the first end and the apparatus further includes a second retainer linked to the second end of the second bearing member for rigidly linking the second bearing member to the mounting member. Here, each of the first and second retainers may include first and second couplers and a retaining member where each first coupler is linked to the mounting member and forms a first coupler surface that defines a plane that is substantially perpendicular to the first bearing surface, each second coupler forming a second coupler surface and linked to the second bearing member, wherein the retaining members rigidly secure each of the second coupler surfaces parallel to and in any of several different positions with respect to a separate one of the first coupler surfaces.

In at least some embodiments each of the first and second forces applied perpendicular to the first and second hopper surfaces further include components along a third trajectory that is perpendicular to the first trajectory, the apparatus also for use with a hopper including a third external surface wherein a third force applied perpendicular to the third surface includes a component along a fourth trajectory that is opposite the third trajectory wherein the first and second bearing members also form third and fourth bearing surfaces, respectively, the first and second applied forces include components along the third trajectory and the third bearing member applies a third applied force to the third hopper surface having a component along the fourth trajectory. In addition, the apparatus may also be for use with a hopper including a fourth external surface wherein a fourth force applied perpendicular to the fourth surface includes a component along the fourth trajectory and the fourth bearing member applies a fourth applied force to the fourth hopper surface having a component along the fourth trajectory. Here the third and fourth applied forces may include components along the first and second trajectories, respectively.

Here the hopper may include a base member that opens concavely upward wherein the base member forms each of the first, second, third and fourth hopper surfaces.

Some embodiments include another retainer linked to a first end of the first bearing member and rigidly linking the first bearing member to the mounting member in any of several different positions relative to the second bearing member so that the first bearing surface applies the first applied force to the first hopper surface.

The invention also includes an apparatus for use with a planting assembly including a mounting member, the apparatus for storing particulate, the apparatus comprising a hopper including first and second wall members that form first and second hopper external surfaces wherein first and second forces applied perpendicular to the first and second surfaces include at least components along first and second opposing trajectories, respectively, a first elongated bearing member rigidly linked to the mounting member and forming a first bearing surface that applies a first applied force to the first hopper surface wherein the first applied force includes at least a first compressing component along the first trajectory, a second elongated bearing member forming a second bearing surface and having a first end and a retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory.

In some embodiments the mounting member includes first and second ends and the apparatus further includes first and second lateral support members and a second retainer, each lateral support member extending from a proximal end to a distal end, the first and second lateral support members mounted at their proximal ends to the first and second ends of the mounting member, respectively, the first bearing member traversing the distance between the proximal ends of the lateral support members and the retainers linking opposite ends of the second bearing member to the distal ends of the lateral support members in any of several different positions such that the second bearing member is substantially parallel to the first bearing member.

In addition, the invention includes an apparatus for use with a planter assembly including a mounting member, the apparatus for storing particulate and comprising first and second elongated lateral support members that extend between proximal and distal ends, are mounted at proximal ends to opposite ends of the mounting member and that extend substantially in parallel and in the same direction from the mounting member to the distal ends, a first elongated bearing member that traverses the distance between and is integrally mounted to the proximal ends, a second elongated bearing member having first and second opposite ends, a hopper having a base member that forms an upwardly concave particulate cavity, the hopper including generally oppositely facing first and second surfaces that form oppositely facing first and second elongated recesses, respectively, the hopper positioned such that the first bearing member is received in the first recess, first and second retainers for securing the first and second ends of the second elongated bearing member to the distal ends of the lateral support members in any of several different positions, respectively, wherein the retainers are secured to the distal ends with the second bearing member received within the second recess.

In some embodiments the distal ends each forms a first coupler member forming a first surface substantially perpendicular to the first bearing member, each first coupler member forming a plurality of parallel slots and each retainer includes a second coupler member mounted to one of the ends of the second bearing member and forming a second coupler surface substantially parallel to the first coupler surfaces, each second coupler member forming a plurality of parallel slots and, wherein, each retainer further including a bolt having a shaft and a nut wherein each shaft is received through adjacent slots in the first and second coupler member and each nut is received on one of the shafts to secure the first and second couplers together in any one of several different relative positions.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Referring now to FIGS. 1 through 4, a preferred embodiment of the present invention will be described in the context of an agricultural assembly 10 which includes a carrier frame assembly 12, a main frame assembly 69 and a planter assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while planter assembly 15, includes components used to plant seeds. Main frame assembly 69 is mounted to carrier frame assembly 12 and planter assembly 15 is mounted to main frame assembly 69.

Figure 3:
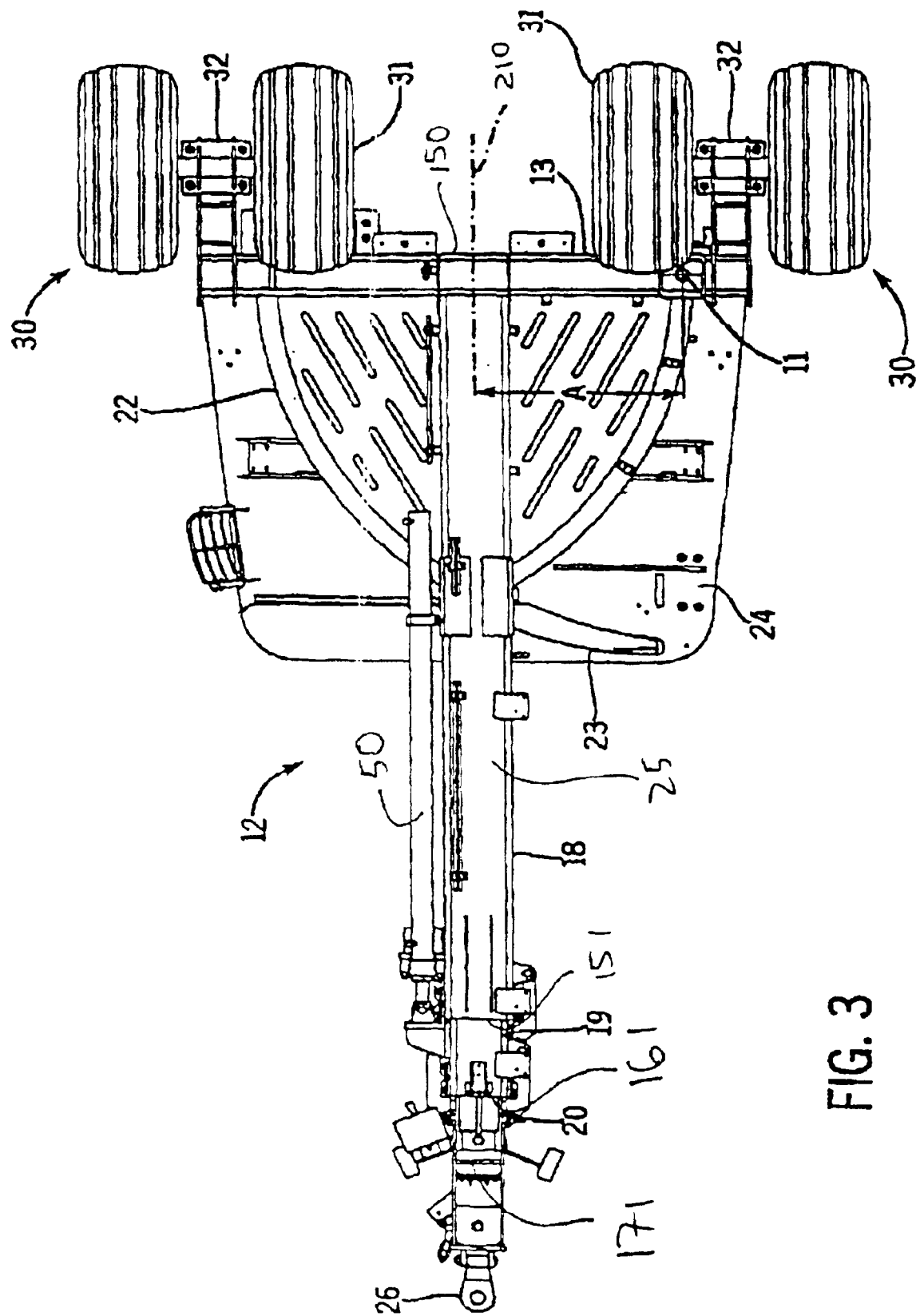
FIG. 3 is a bottom plan view of the carrier frame illustrated in FIG. 1.
Figure 4:
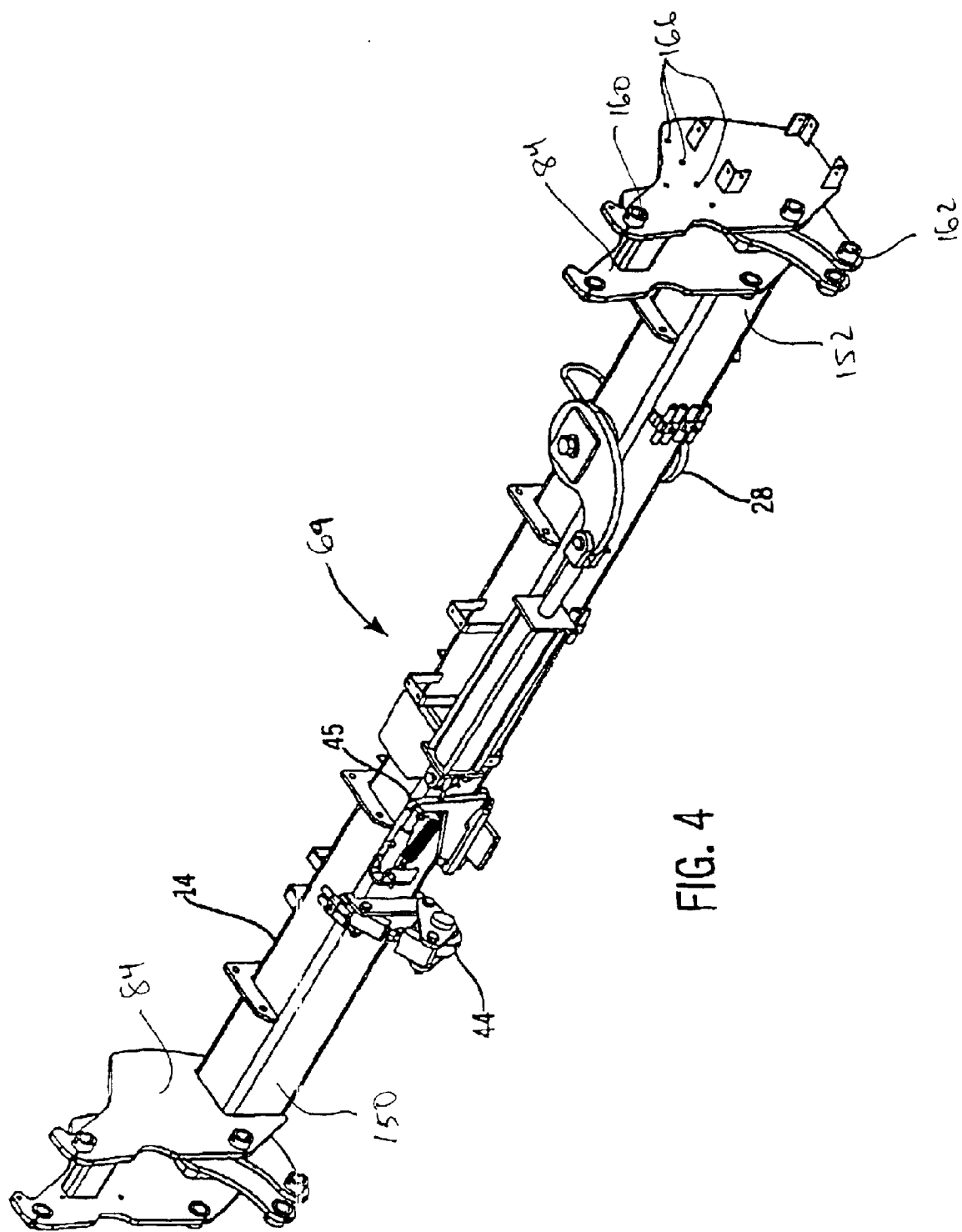
FIG. 4 is a perspective view of a mainframe assembly used with the configuration of FIG. 1.
Figure 5:
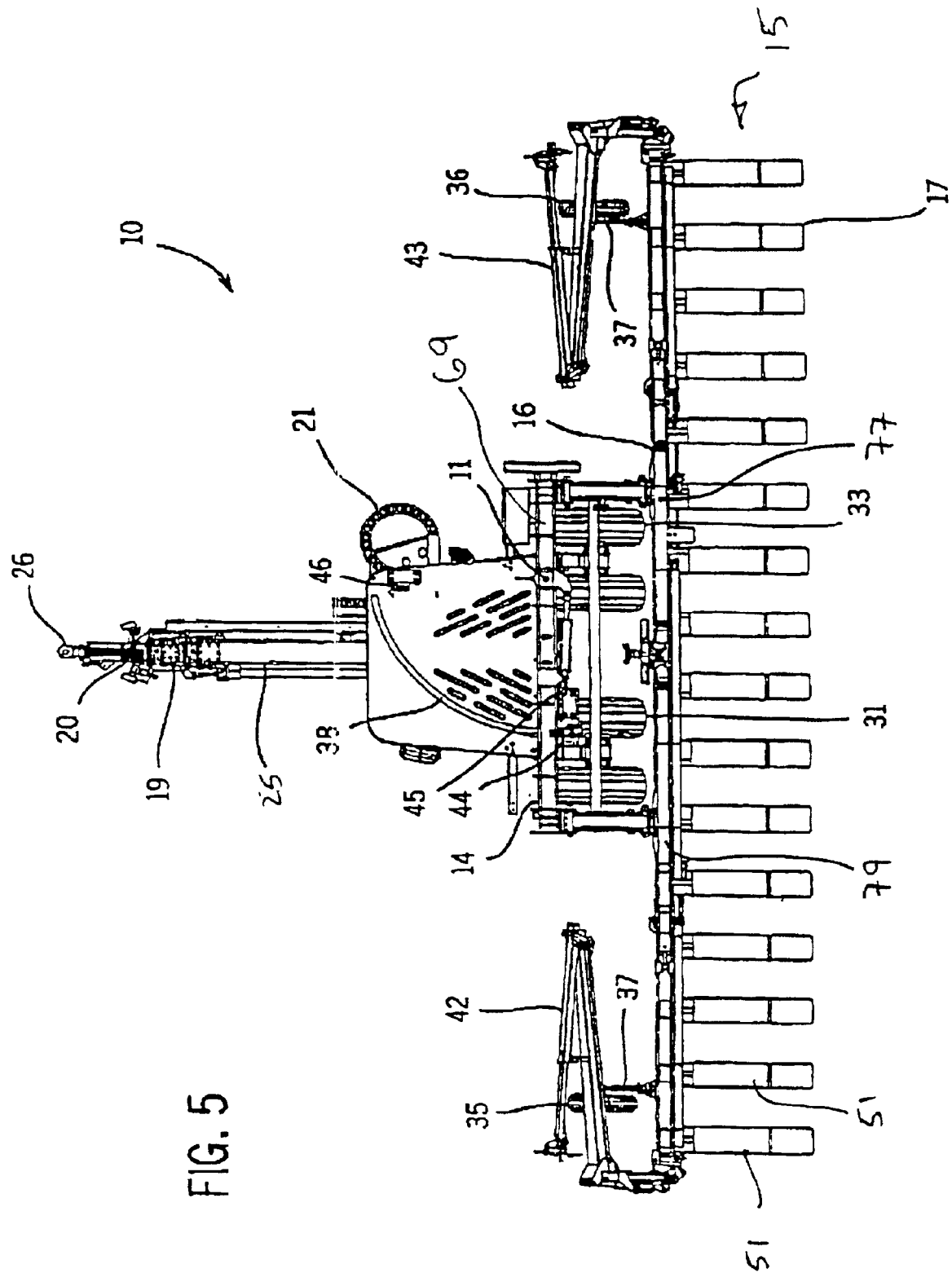
FIG. 5 is a top plan view of the embodiment of FIG. 1 in an extended operating position.

Referring still to FIGS. 1 through 4 and also to FIG. 5 (and generally to other Figures in the specification), the exemplary planter assembly 15 includes an implement bar 16, row units 17, support wheels 35, 36, wheel support members 37, extendable markers 42, 43 and a plurality of seed delivery ducts or hoses that are bundled into two delivery sheaths 77 and 79. Implement bar 16 is typically a rigid steel rectilinear bar having dimensions within the six by six to ten by ten range and extends along the length of implement assembly 15. Bar 16 is generally mounted to main frame assembly 69 in a manner described below.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10. Row units 17 and delivery sheaths 77 and 79 are described in more detail below.

Figure 6:
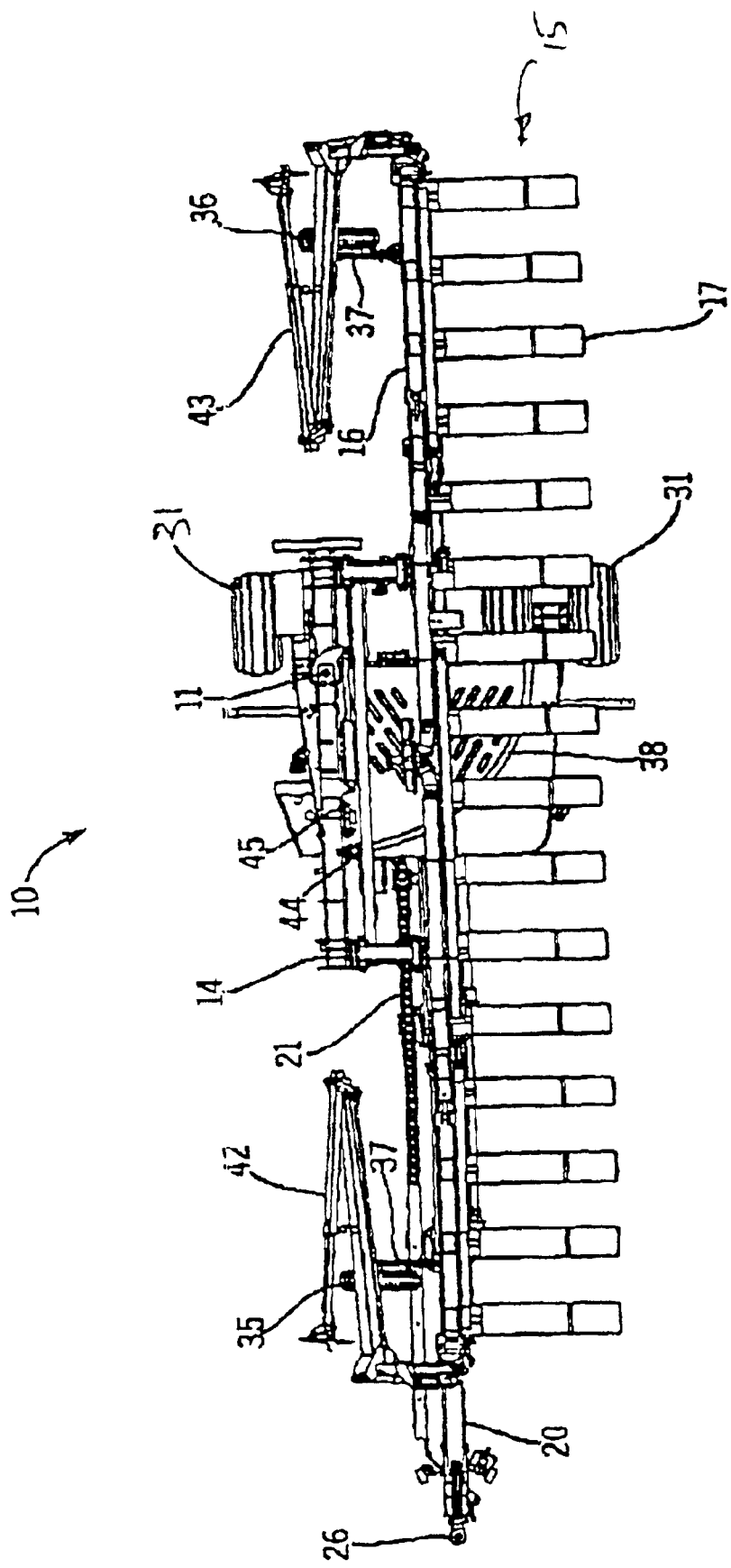
FIG. 6 is a top plan view of the embodiment of FIG. 1 in a transport position.

Referring now to FIGS. 4 and 9 through 12, the main frame assembly 69 includes, among other components, a main frame bar member 14 (also referred to as a mounting member) having first and second opposite ends 150 and 152, respectively, a roller assembly 44, a latching assembly 45, a pivot plate 28, implement mounting plates collectively identified by numeral 84 and a hopper and hopper support assembly 80. Pivot plate 28 is mounted to an undersurface of bar member 14 about one-fourth the length of bar member 14 from a first end thereof and forms a downwardly opening pivot receiving aperture (not observable in the Figs.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equi-spaced along the length of bar 14. Positioning of plate 28 and wheel assembly 44 is important to ensure proper balancing of the attached implement assembly 15 and is generally a function of how best to balance assembly 15 about a carrier assembly axis 210 (see FIG. 2).

Implement mounting plates 84 are integrally and rigidly mounted at opposite ends 150 and 152 of bar member 14 and are fitted to receive and support implement bar 16 as well as main hopper and support assembly 80 as described in more detail below. To this end plates 84 extend upwardly from bar 14 and each forms at least two separate pivot apertures (see 160 and 162 in FIG. 4) as well as a plurality of non-pivot apertures some of which are collectively identified in FIG. 4 by numeral 166.

Although not illustrated, assembly 10 further includes first and second lift cylinders and corresponding first and second pivoting brackets 124, 126 (see FIGS. 1 and 9) that are constructed so that opposite ends of each bracket 124, 126 are pivotally securable to mounting plates 84 and implement bar 16. The cylinders are secured at pivot apertures 160 while the brackets 124, 126 are secured at pivot apertures 162. The first and second lift cylinders each includes a rod end and a base end and opposite ends are linked to the plates 84 and the implement bar 16 such that, when the cylinders are retracted, the implement bar 16 and linked components are lowered into a functional and ground engaging position (illustrated in FIG. 1) and, when the cylinders are extended, implement bar 16 is raised into a transport and ground clearance position illustrated in FIGS. 8 and 9. When in the functional position, various components of each row unit 17 engage or at least interact with the ground there below in a manner to be described in more detail below.

Figure 1:
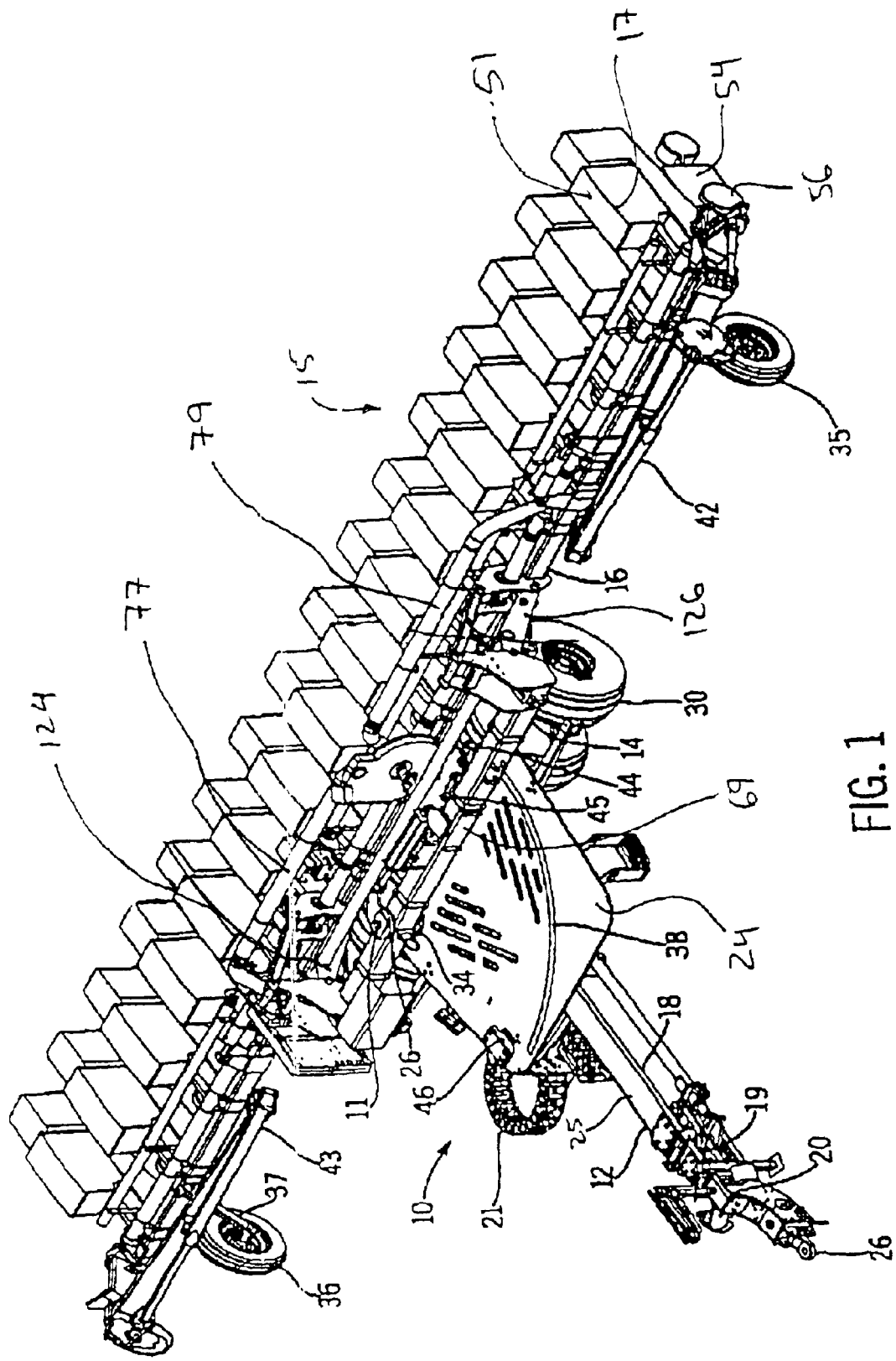
FIG. 1 is a is perspective view of a preferred embodiment of a planter apparatus constructed in accordance with one embodiment of the present invention.
Figure 8:
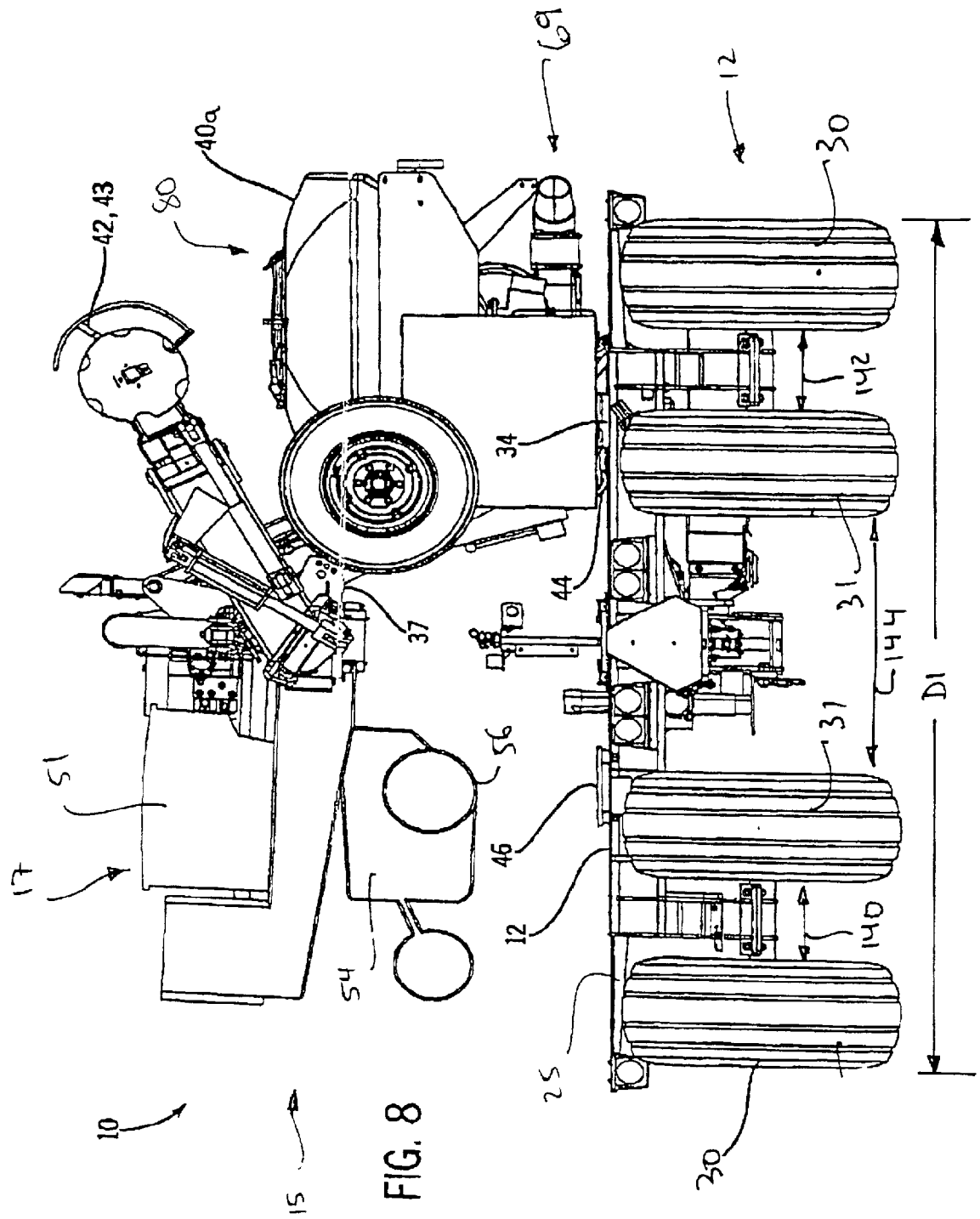
FIG. 8 is a rear perspective view of the embodiment illustrated in FIG. 1 with storage units attached and in the transport position.

Referring still to FIGS. 1 and 8, exemplary assembly 10 includes sixteen row units 17 equi-spaced along the length of bar 16. As well known in the art each unit 17 includes some type of mini-hopper 51, some type of soil agitator 56 (e.g., a coulter or spade of some type) and a seed metering device 54. As their label implies, the mini-hoppers 51 are simply small seed hoppers of bins that reside generally near the upper portions of each row unit 17. Seed is provided to each mini-hopper by one of the seed delivery tubes bundled within one of sheaths 77 or 79.

A separate mini-hopper 51 is positioned above a row specific metering devices 54 (see FIG. 8). In addition, a separate agitator 56 is mounted to the metering devices such that the agitator is directly in front of a lower end of a corresponding metering device 54 when the assembly 10 is pulled through a field. As assembly 10 is pulled through a field, agitators 56 each form a trench into which a corresponding metering device 54 deposits seeds.

Referring to FIG. 8, support wheels 31 are separated and form spaces 140, 142, 144, etc., that, as assembly 10 is pulled through a field, travel along paths that are between crop rows being formed. Referring also to FIG. 1, row units 17 are positioned on bar 16 such that units directly behind a dimension D1 formed by the wheels 31 form rows between the wheels. For instance, one row unit 17 may be mounted to bar 16 so that a resulting row is formed within the space defined by the paths formed by the left two wheels as illustrated, another row unit 17 may be mounted to bar 16 so that a resulting row is formed within the space defined by the paths formed by the right two wheels as illustrated and perhaps two row units may be mounted to form two rows in the space between paths defined by the center wheels.

Figure 11:
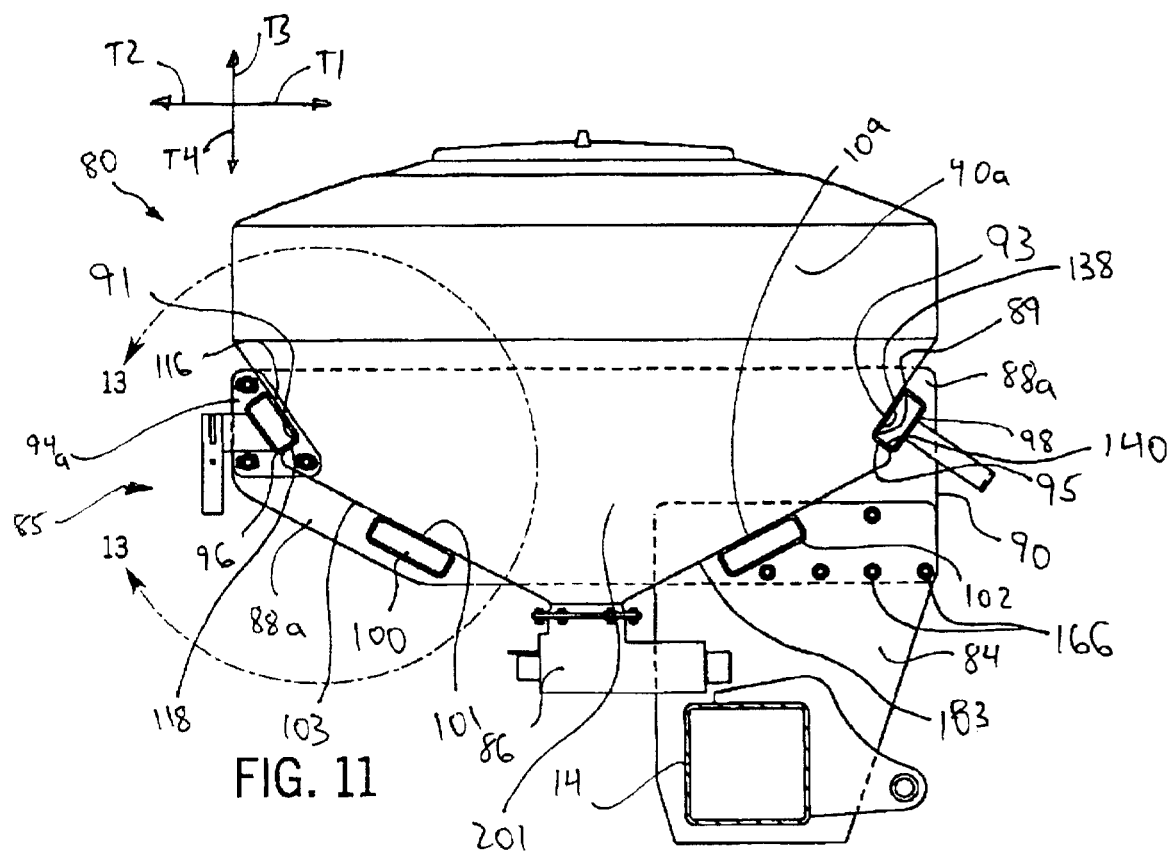
FIG. 11 is a partial cross sectional view taken along the line 11—11 in FIG. 10.

Referring now to FIGS. 8 through 15, main hopper and hopper support assembly 80 includes a support assembly 85 and first and second main hoppers 40a and 40b. Each of hoppers 40a and 40b are similar and therefore, in the interest of simplifying this explanation, only hopper 40a will be described here in detail. Referring to FIG. 11 hopper 40a includes a base 201 that slopes downwardly and opens into an outlet assembly 86 that is linked to seed delivery assembly components. Base 201 forms an upwardly concave cavity for receiving and storing seed. Some type of cover or cover assembly (see 82a and 82b in FIG. 10) is provided to close off the top of the base defined cavity. The bottom walls of base 201 form a plurality of external surfaces including surfaces 130, 132, 103, 183, 140 and 138 that cooperate with surfaces of support assembly 85 to support and lock hopper 40a in the operating position illustrated in FIG. 9.

Figure 12:
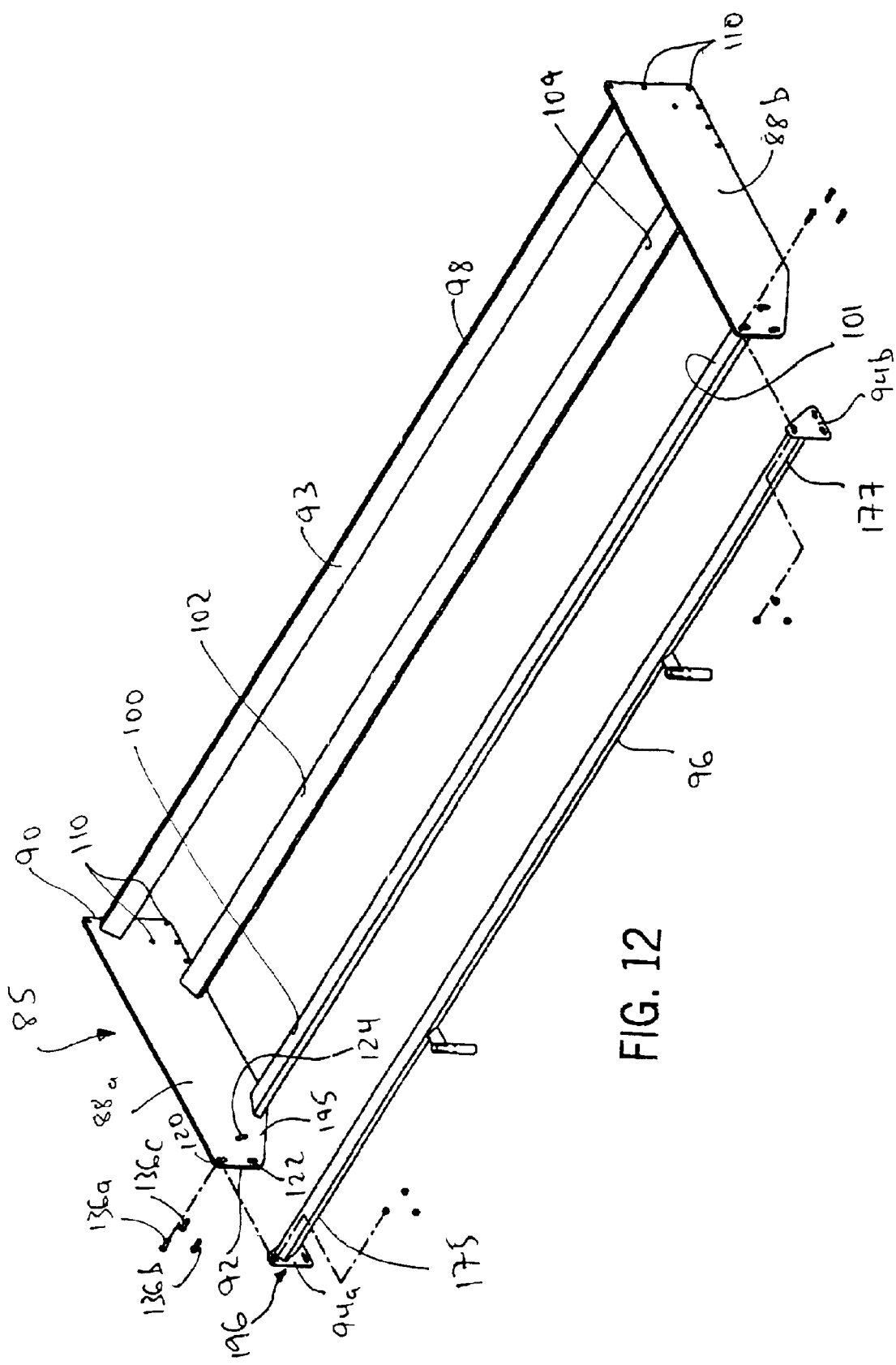
FIG. 12 is a perspective view of the support and lockdown assembly of FIG. 11.

As best seen in FIG. 12, support assembly 85 includes first and second lateral support members 88a and 88b, first and second bearing members 98 and 100, respectively, and first and second support members 100 and 102, respectively. Each of the lateral support members 88a and 88b are similarly constructed and operate in a similar fashion and therefore, in the interest of simplifying this explanation, only member 88a will be described. Member 88a is an elongated rigid steel member having first and second oppositely directed ends 90 and 92, respectively. Member 88a forms a plurality of apertures some of which are collectively identified by numeral 110 at first end 90 that are arranges so that they match the arrangement of apertures 166 formed by plates 84 (see FIG. 4 also). Thus, first ends 90 of members 88a and 88b are securely mountable to plates 84 at opposite ends of bar 14 using bolts or any other suitable mechanism. In FIG. 11 member 88a is shown mounted to plate 84. In FIG. 11 the detail of plate 84 including the pivot apertures 160 and 162 has been omitted to reduce unnecessary illustrative clutter.

Support members 100 and 102 are elongated rigid members mounted at opposite ends to each of lateral members 88a and 88b and proximate lower edges of members 88a and 88b so that support surfaces 101 and 109 face upwardly. First bearing member 98 is constructed in a similar fashion to support members 100 and 102 and, to that end, is a rigid elongated member mounted at opposite ends to the first ends (e.g., 90) of each of lateral members 88a and 88b. As seen in FIG. 11, member 98 forms two surfaces 93 and 95 of interest with respect to the present invention. As illustrated, in the exemplary embodiment member 98 has a rectilinear cross section and therefore surfaces 93 and 95 are perpendicular. It should also be noted that member 98a is angled such that surface 93 faces upward and to the side on which members 100 and 102 reside.

Referring still to FIGS. 8 through 16 and specifically to FIG. 12, second bearing member 12 is similar in construction to members 98, 100 and 102 in that member 96 is rigid and elongated having first and second opposite ends 175 and 177, respectively. However, member 96, unlike members 98, 100 and 102, is not integrally secured to lateral members 88a and 88b but instead is removably secured thereto. More specifically, restrainers or restraining assemblies are provided at each end of member 96 that can be used to mount member 96 between the second or distal ends (e.g. 92 in FIG. 12) of lateral members 88a and 88b. Moreover, the restraining assemblies are adjustable such that the relative position of bearing member 96 with respect to bearing member 98 is adjustable. Furthermore, in at least some embodiments the restraining assemblies are adjustable such that member 96 can be adjusted both vertically and horizontally with respect to bearing member 98.

Figure 13:
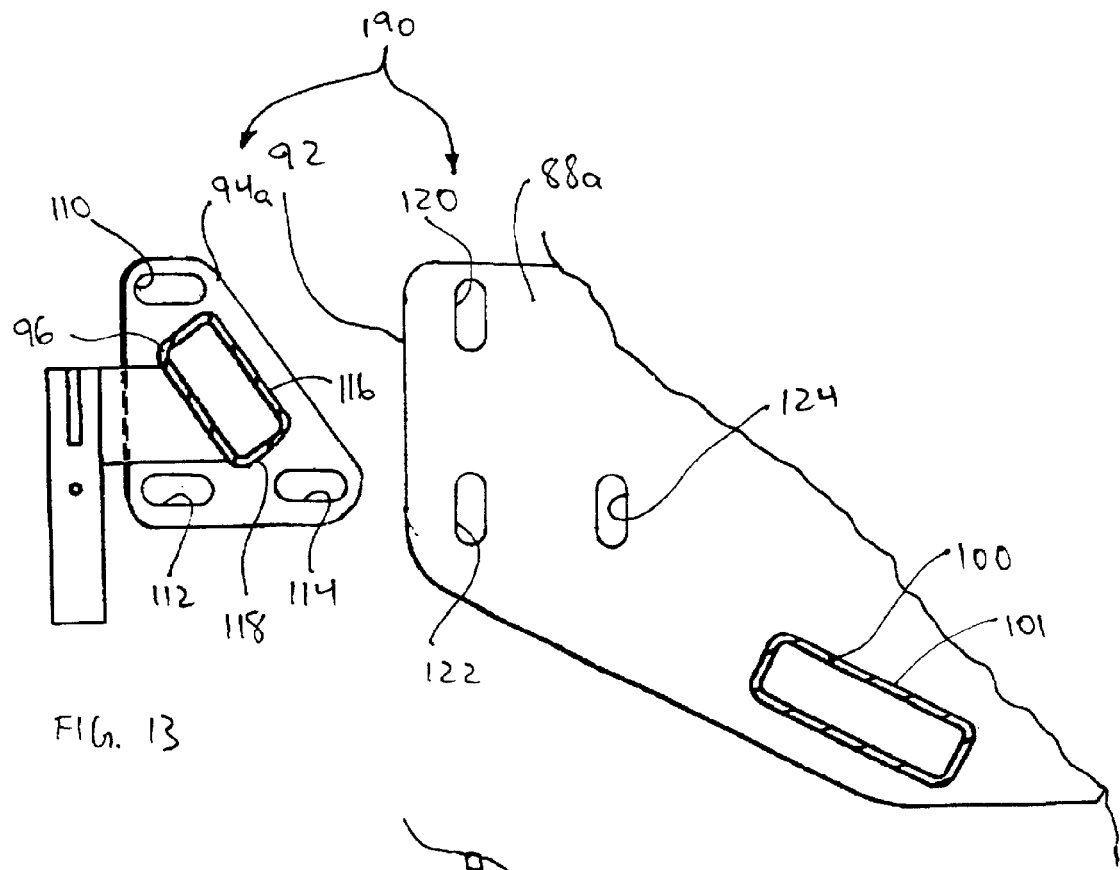
FIG. 13 is a partial cross sectional view taken around the area identified by line 13—13 in FIG. 11, albeit without a hopper being supported.

Referring to FIG. 13, member 96 forms two adjacent bearing surfaces 116 and 118 that are of interest to the present invention. Member 96 is rectilinear and therefore adjacent surfaces 116 and 118 are perpendicular. When mounted between members 88a and 88b, member 96 is generally perpendicular to each of members 88a and 88b and surface 116 faces upwardly and to the side on which members 98, 100 and 102 reside. Thus, surfaces 116, 101, 109 and 93 together define a space therebetween that opens concavely upwardly. With member 96 loosely mounted between members 88a and 88b (i.e., so that member 96 can be moved vertically and horizontally within the limits allowed by the couplers), the member defined space is generally sized and shaped to receive and support the underside of hopper 40a.

Figure 9:
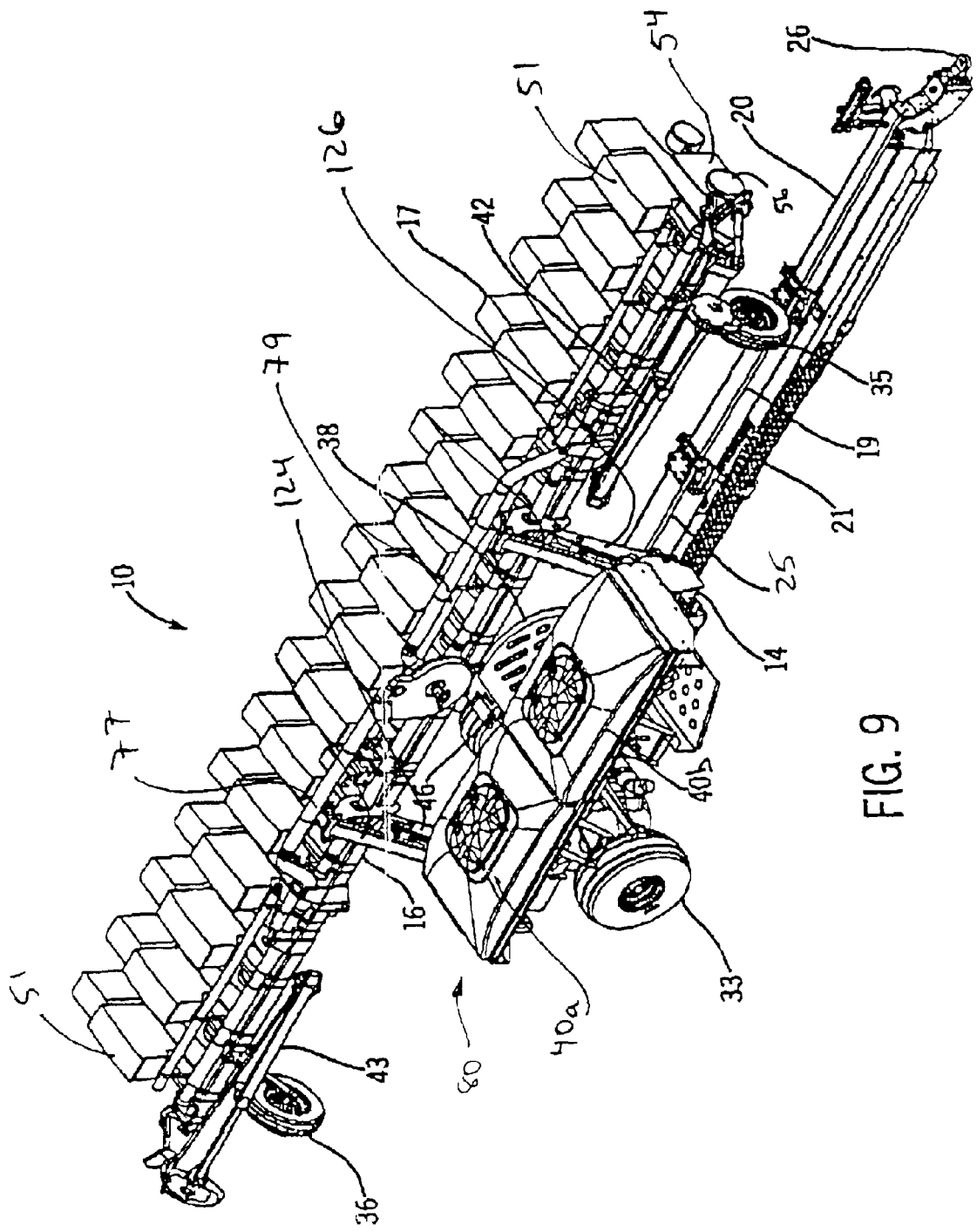
FIG. 9 is a perspective view of the embodiment of FIG. 8 with storage units in the transport position.
Figure 10:
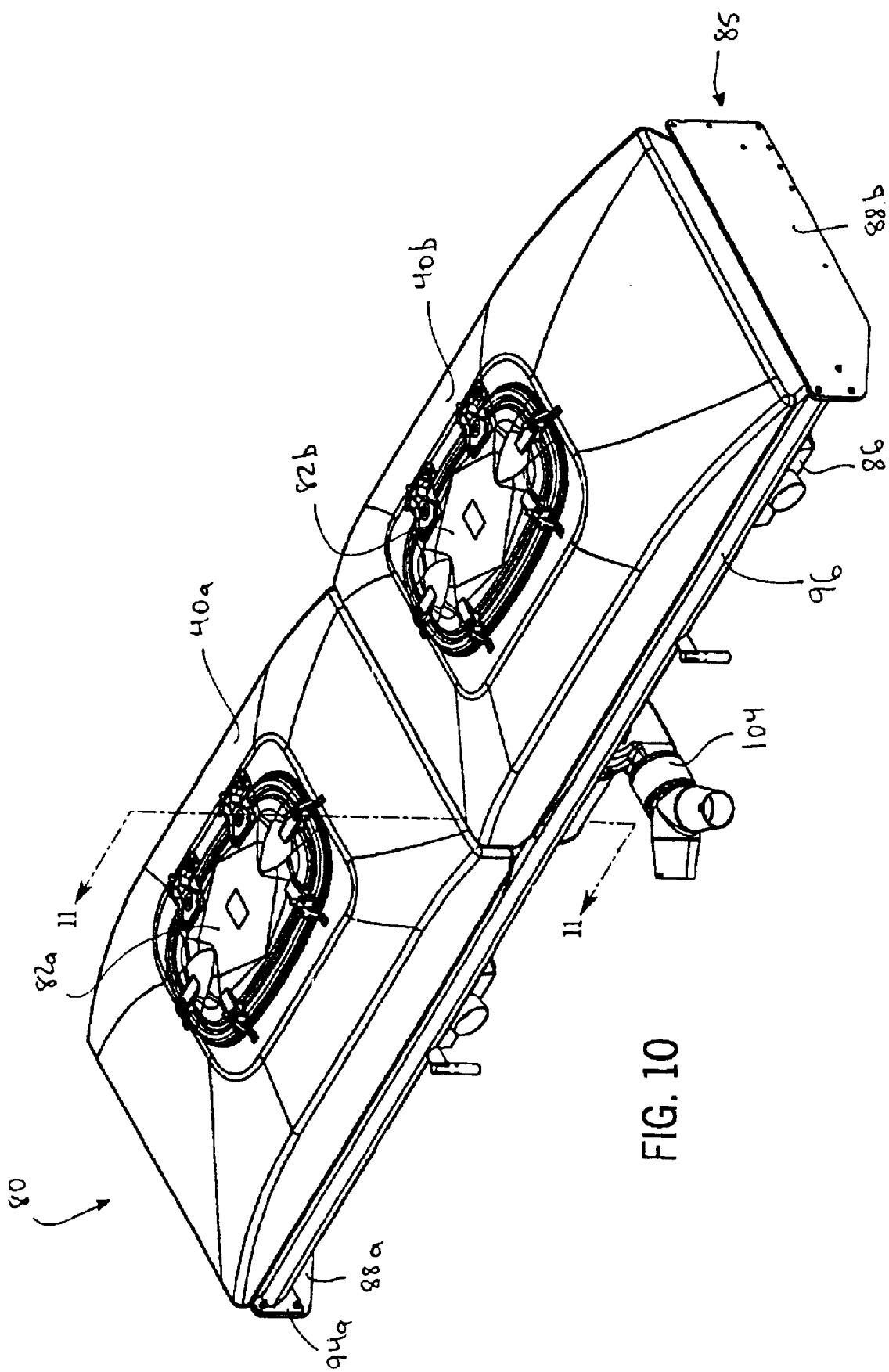
FIG. 10 is a perspective view of the hopper and hopper support assembly of FIG. 9.

To this end, the underside of hopper 40a generally defines several substantially flat surfaces that essentially mirror the juxtaposition of surfaces 116, 101, 109 and 93. The hopper undersurfaces include surfaces 103 and 183 that are received and supported by surfaces 101 and 109, respectively. In addition, the hopper undersurfaces also include surface 130 (see FIG. 14) and surface 138 (see FIG. 11) that are received and supported by surfaces 116 and 93, respectively. Furthermore, the hopper undersurfaces include two other surfaces 132 and 140 that are essentially perpendicular to surfaces 130 and 138, respectively, and that fill a gap between adjacent edges of surfaces 130 and 103 and surfaces 138 and 183, respectively. Each of surfaces 130, 132, 103, 183, 140 and 138 generally extends the length of hopper 40a where the hopper length is generally parallel to surface 93 when hopper 40a rests thereon. It is also contemplated that assembly 85 may be approximately twice as long as hopper 40a so that assembly 85 can support and lock two hoppers as illustrated in FIG. 9.

With hopper 40a configured as described above it should be appreciated that surfaces 138 and 140 and surfaces 130 and 132 form oppositely facing first and second elongated recesses 89 and 91, respectively, where, when hopper 40a is supported by assembly 85, member 98 is generally received within recess 89 and member 96 can be positioned to generally be proximate or received within recess 91.

In the interest of simplifying this explanation it is helpful to adopt specific reference names for various assembly components and relative directions in the Figs. To this end, referring still to FIGS. 11 through 13, surface 93 will be referred to herein as a first bearing surface, surface 116 will be referred to as a second bearing surface, surface 95 will be referred to as a third bearing surface and surface 118 will be referred to as a fourth bearing surface. Similarly hopper surfaces 138, 130, 140 and 132 will be referred to hereinafter as first, second, third and fourth hopper surfaces. In addition, referring to FIGS. 11 and 16, the fourth directions on a cartesian coordinate system will be referred to as first, second, third and fourth trajectories T1, T2, T3 and T4, respectively.

Each of the restraining assemblies for securing member 96 between lateral members 88a and 88b are similarly constructed and operate in a similar fashion and therefore only the restraining assembly corresponding to end 175 will be described here in the interest of simplifying this explanation. Referring now to FIGS. 12 and 13, a first exemplary restraining assembly 190 includes a first coupler member formed by the distal end 92 of lateral member 88a, a second coupler member 94a and a restraining member in the form of three bolts and associated nuts 136a, 136b and 136c. End 92 forms a first coupler surface 195 within a plane that is substantially flat and perpendicular to first bearing surface 93. The exemplary end 92 forms three first coupler elongated apertures or slots 120, 122 and 124 having generally horizontally arranged and parallel lengths that are sized such that each aperture can receive a shaft of one of bolts 136a, 136b or 136c. Slots 120 and 122 are formed so that slot 120 is vertically above slot 122. Slot 124 is formed so that slot 124 IS horizontally adjacent slot 122 and to the proximate side 90 (see FIG. 12) of slot 122.

Second coupler member 94a forms a second coupler surface 196 that is substantially flat and also forms three elongated apertures or slots 110, 112 and 114. The lengths of slots 110, 112 and 114 are parallel and, in the illustrated exemplary embodiment, are generally vertically arranged when coupler member 94a is mounted to end 93. Slots 110, 112 and 114 are arranged in a fashion similar to that of slots 120, 122 and 124 so that the intersections of aligned slots form passageways for receiving bolt shafts. For instance, referring specifically to FIG. 14, member 94a may be positioned adjacent end 92 such that slots 110 and 120 form a passageway for receiving the shaft of bolt 136a (see also FIG. 15), slots 112 and 122 form a passageway for receiving the shaft of bolt 136b (see also FIG. 15) and slots 114 and 124 form a passageway for receiving the shaft of bolt 136c.

Figure 14:
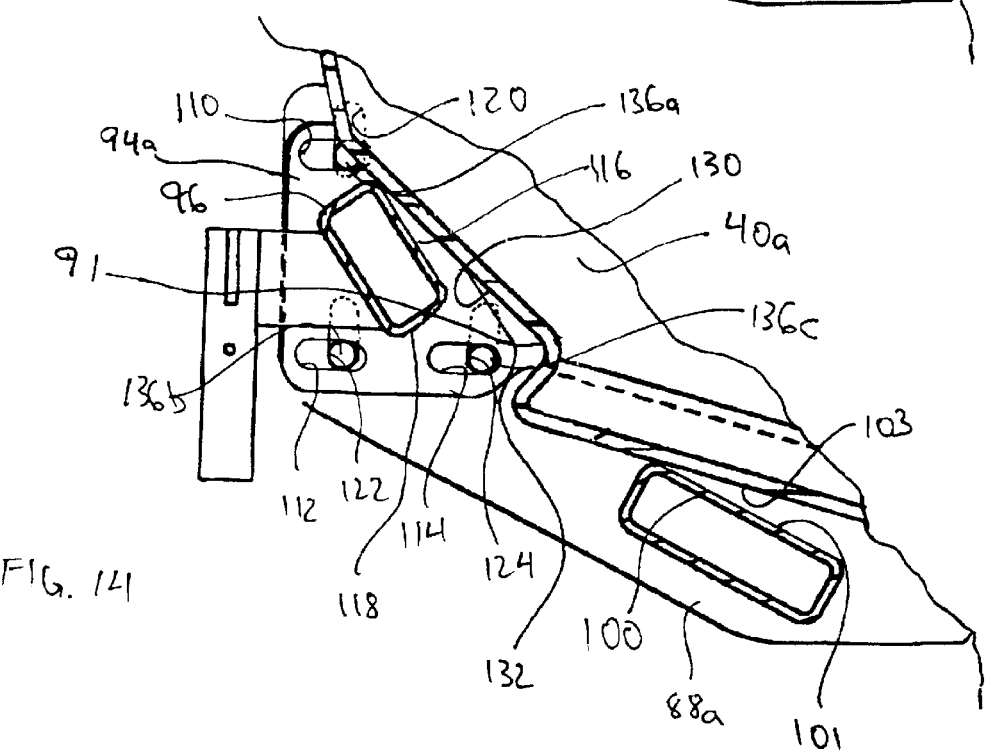
FIG. 14 is similar to FIG. 13, albeit with a coupler member and a lateral support end aligned and with a hopper in a supported position.
Figure 15:
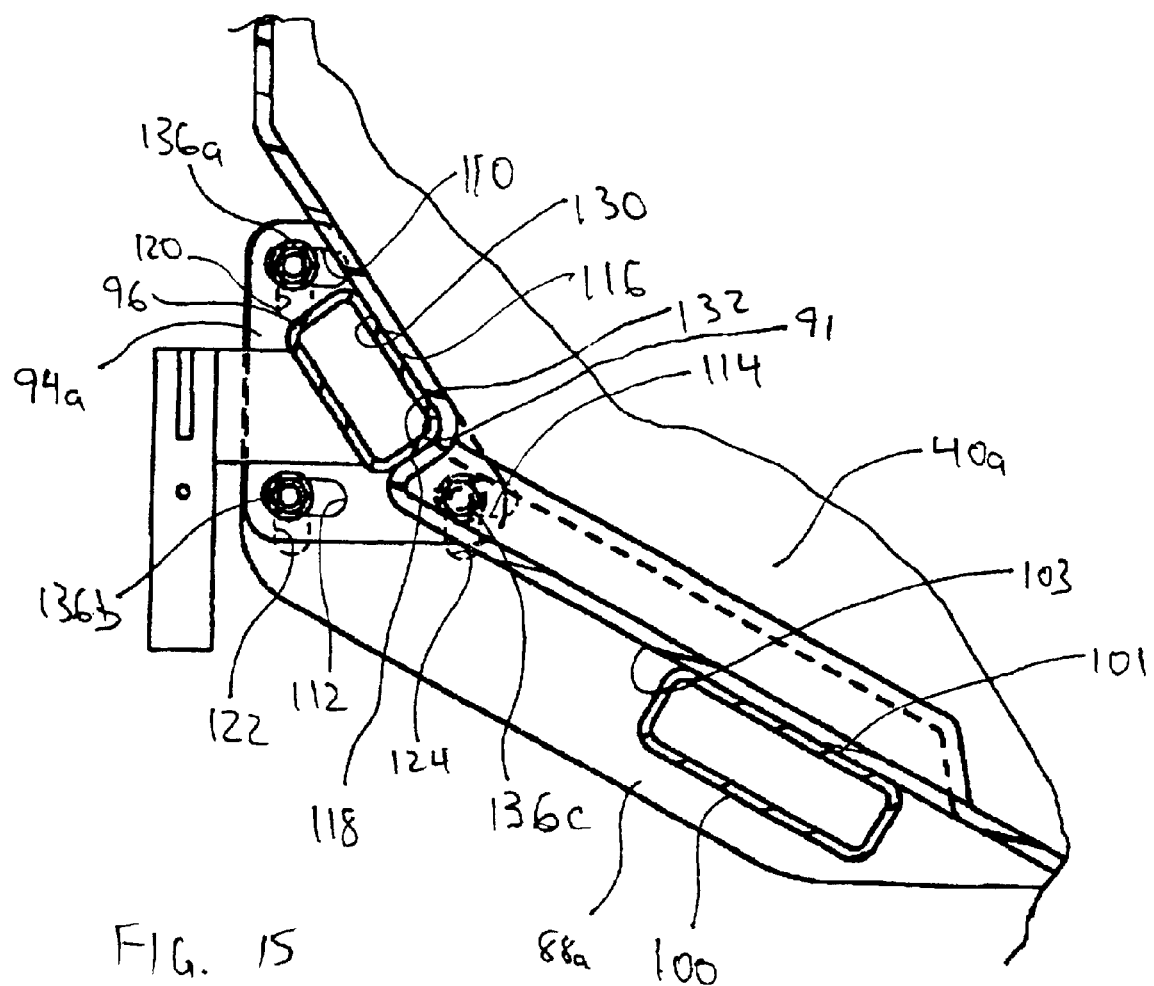
FIG. 15 is similar to FIG. 14, albeit with the hopper in a supported and locked position.

Member 96 is placed between distal ends (e.g., 92) of lateral members 88a and 88b so that adjacent slot pairs (e.g., pairs 110, 120, pair 112, 122 and pair 114, 124 and similar pairs formed by the distal end of member 88a and coupler member 94b) align as illustrated in FIG. 14. Thereafter, bolts 136a, 136b and 136c are slid through corresponding passageways and associated nuts are received on the ends of the shafts to loosely secure member 96 between members 88a and 88b.

Referring still to FIG. 14, with member 96 loosely secured between members 88a and 88b, main hopper 40a is placed within the upwardly concave space defined by surfaces 130, 103, 183 and 138 so that recess 89 is generally proximate the corner defined by surfaces 138 and 140. When so positioned the recess 91 formed by surfaces 130 and 132 are at least proximate the corner defined by second bearing member surfaces 116 and 118. Next, an assembly user forces member 96 both vertically upward within the limits defined by apertures 120, 122 and 124 and horizontally toward hopper 40a within the limits defined by apertures 110, 112 and 114, with bolts 136a, 136b and 136c and similar bolts associated with coupler member 94b restraining motion.

The corner formed by surfaces 116 and 118 is generally received within recess 91 so that surfaces 116 and 118 place forces on adjacent surfaces 130 and 132 and so that member 96 forces the other side of the hopper toward first bearing member 98 and surfaces 93 and 95 place forces on surfaces 138 and 140, respectively. When so positioned the bolts 136a, 136b and 136c and similar bolts corresponding to coupler member 96a are tightened to lock the hopper in place. In at least one embodiment each of the slots (e.g., 110, 120, etc.) is several inches long so that the range of vertical and horizontal positions in which member 96 can be locked in appreciable.

Figure 16:
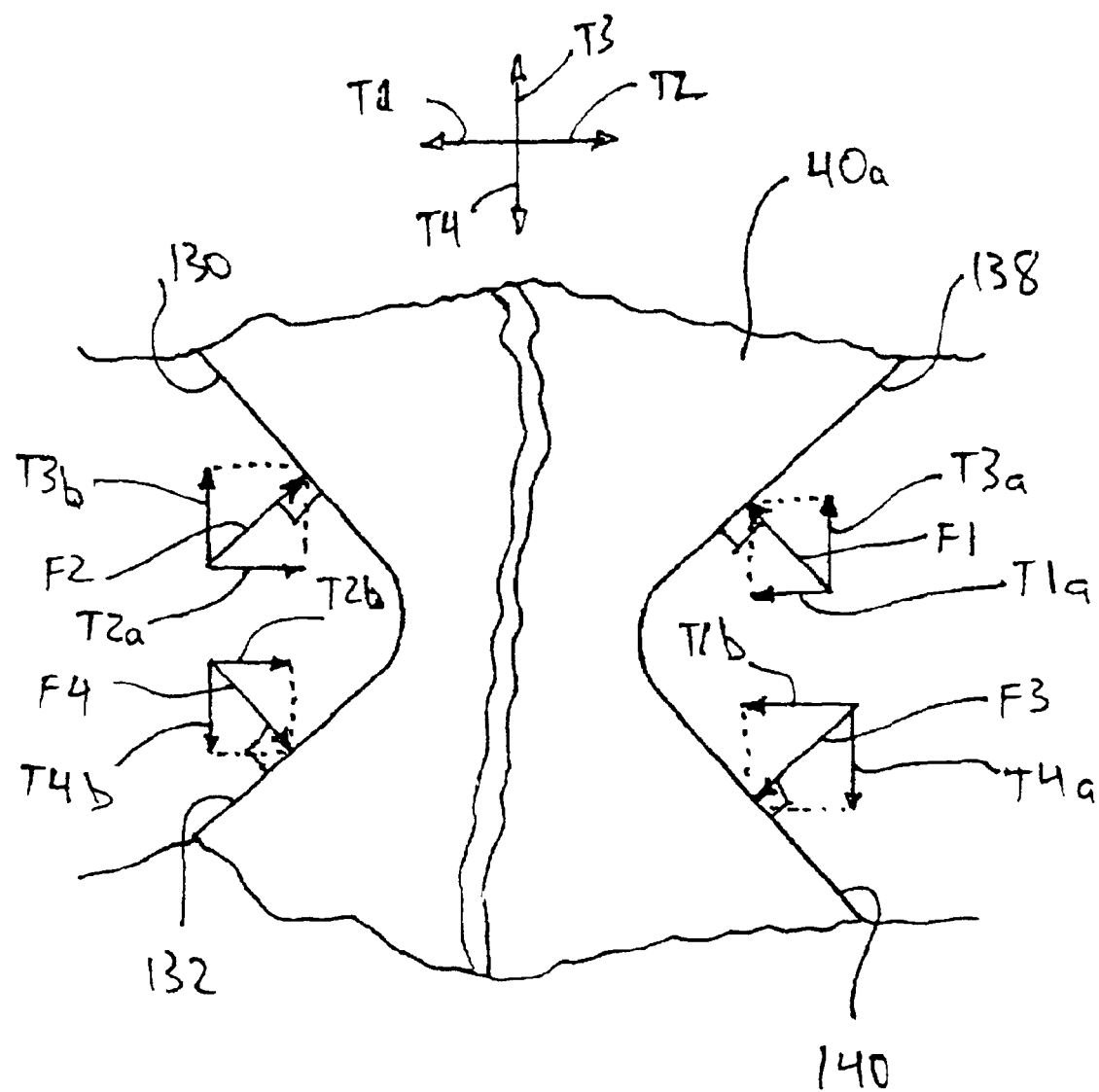
FIG. 16 is a schematic diagram illustrating various forces that are applied by bearing members to the external walls of the hopper of FIG. 11.

Referring to FIG. 16 the forces applied by surfaces 116, 118, 93 and 95 are illustrated. To this end, the forces applied by surfaces 93, 116, 95 and 118 will be referred to hereinafter as first, second, third and fourth applied forces F1, F2, F3 and F4 that are generally perpendicular to their corresponding surfaces 93, 116, 95 and 118, respectively. In the illustrated embodiment vertical and horizontal hopper movement is restrained by applying forces that restrain upward and downward movement as well as movement to either side. To this end, first force F1 includes a first compressing component $T1a$ along first trajectory T1 as well as a component T3a along the third trajectory T3, second force F2 includes a second compressing component T2a along second trajectory T2 as well as a component T3b along the third trajectory T3, third force F3 includes a component T1b along first trajectory T1 as well as a component T4a along the fourth trajectory T4 and fourth force F4 includes a component T2b along first trajectory T1 as well as a component T4b along the fourth trajectory T4 where, as indicated in FIG. 16, trajectories T1 and T2 are horizontally left and right, respectively, and trajectories T3 and T4 are vertically up and down, respectively Thus, the opposite components T1a, T2b, vs. T2a, T2b along the first and second trajectories T1 ands T2 restrain side to side hopper motion and the opposite components T3a, T3b vs. T4a T4b along the third and fourth trajectories T3 and T4 restrain vertical hopper motion.

It should be appreciated that the assembly described above allows a planter user to employ hoppers having variable and imperfect dimensions within an appreciable range. The length characteristics of each of apertures 110, 112 and 114 allow horizontal relative movement of bearing member 96 and second and fourth bearing surfaces 116 and 118 with respect to first and third bearing surfaces 138 and 140. Similarly, the length characteristics of each of aperture 120, 122 and 124 allow vertical relative movement of bearing member 96 and corresponding surfaces with respect to first and third bearing surfaces 138 and 140.

Referring again to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of support wheels 31 mounted on opposite sides of a corresponding support member 32. As best seen in FIG. 8, the support wheels 31 define support dimension D1. Dimension D1 is wide enough that the entire planter assembly 10 is laterally stable but should be limited to a size that is accommodated by a typical roadway. For instance, dimension D1 may be between 10 and 15 feet.

Cross bar 13 is a steel elongated bar. A separate one of wheel assemblies 30 is mounted at each one of the cross bar 13 ends and extends downward there from so that assemblies 30 support cross bar 13 above ground. A pivot pin 34 is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 2:
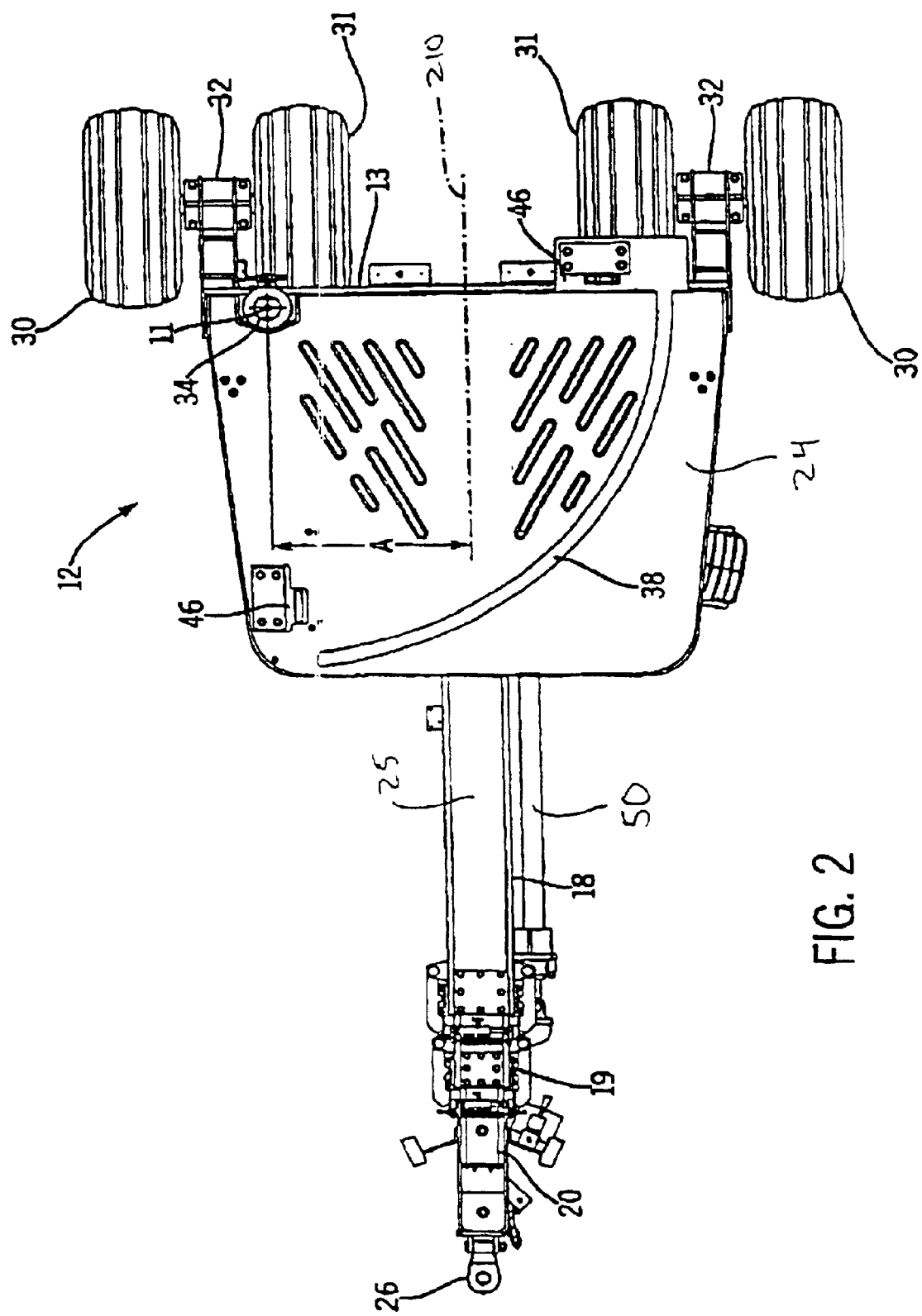
FIG. 2 is a top plan view of the carrier frame of illustrated in FIG. 1.

Referring to FIGS. 2 and 3, draw bar assembly 18 is a two stage tongue assembly. Assembly 18 is described in great detail in the Planter Hitch Apparatus patent application referenced above and which has been incorporated herein by reference and therefore apparatus 18 will not again be described here in detail. Suffice it to say at this time that, among other components, assembly 18 includes a first tongue member 25 having first and second ends 150 and 151 and forming a first passageway (not illustrated). As best seen in FIG. 3, first tongue member 25 is secured at its first end 150 to a central point of cross bar 13 via welding or some other suitable securing process. In addition, assembly 18 further includes second and third tongue members 19 and 20, respectively, and includes two tongue cylinders (only one shown at 50, the second tongue cylinder internally disposed within the tongue assembly). Second member 19 is receivable within first tongue member 25 and first tongue member 20 is receivable within second tongue member in a telescoping manner such that, when retracted, distal ends 171, 161 and 151 of members 20, 19 and 25, respectively, are adjacent each other. Members 19 and 25 are driven by cylinder 50 and the internally mounted cylinder between the retracted and operating configuration illustrated in FIG. 3 and the extended and transport configuration illustrated in FIG. 9. A hitch member 26 is mounted to the distal end 171 of tongue member 20 for linking assembly 10 to a prime mover like a tractor.

Referring to FIGS. 2, 3, 8, platform 24 is essentially a rigid flat bed member that is secured to a top surface of cross bar 13 and approximately half of first tongue member 25 proximate cross bar 13. Referring also to FIGS. 11 and 12, additional support bars 62 may also be provided to support platform 24. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner 38 is dimensioned so as to securely support the roller of assembly 44 in any position along the runner and thereby provide support to main frame bar 14 there above.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 34 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are moveable between the transport position illustrated in FIG. 9 to the operating position illustrated in FIG. 1 and to any intermediate position there between (see FIG. 7) by simply rotating main frame bar 14 about pivot pin 34.

As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 7:
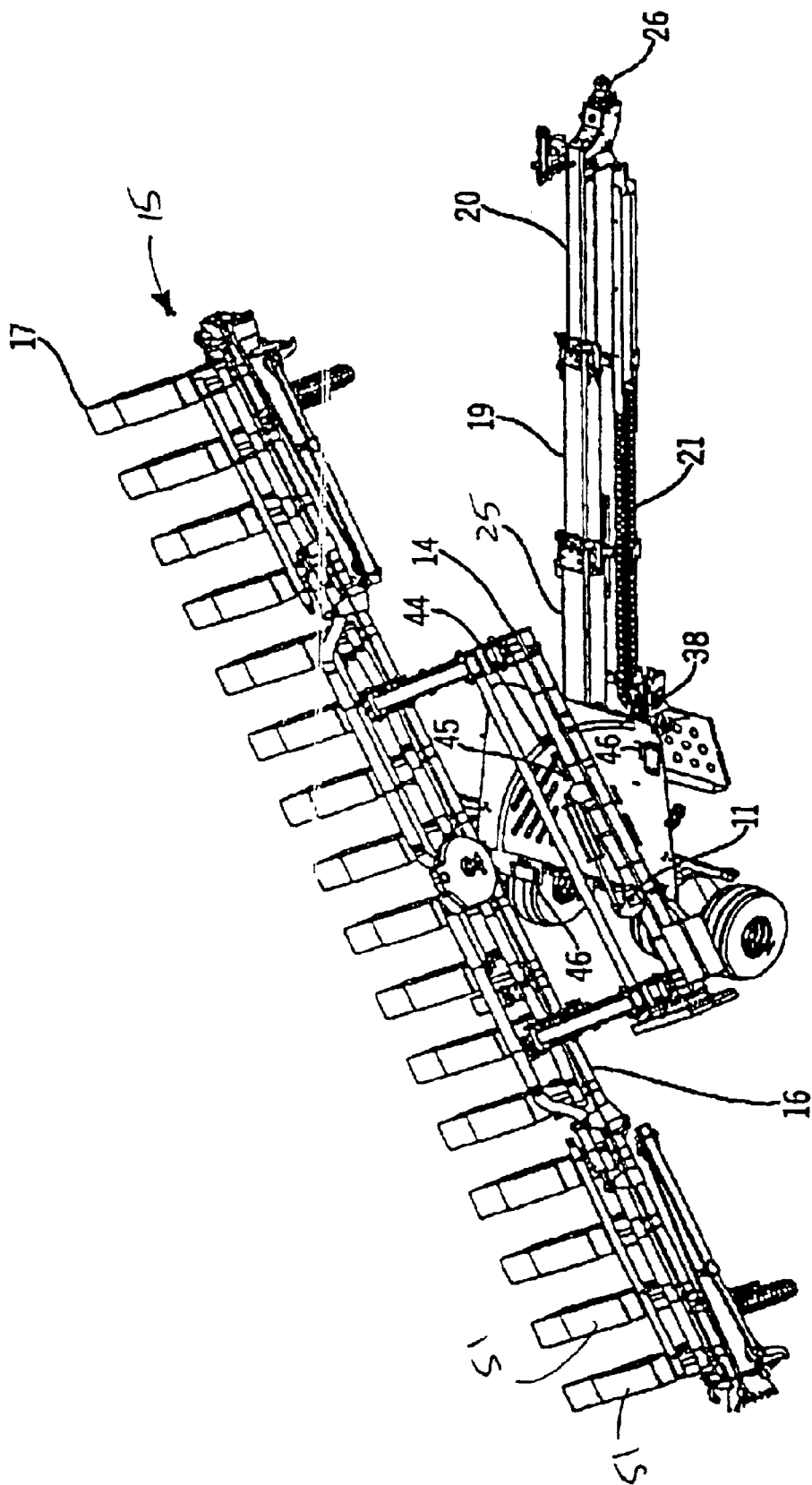
FIG. 7 is a perspective view of the embodiment of FIG. 1 in an intermediate position with an implement between the operating and the transport positions.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

It should be understood that the methods and apparatuses described above are only exemplary and do not limit the scope of the invention, and that various modifications could be made by those skilled in the art that would fall under the scope of the invention. For example, while the invention is described as one wherein bolts and nuts are used to mount the second bearing member 96 to the lateral members 88a and 88b, other restraining mechanisms are contemplated. In addition, is at least some embodiments support members 100 and 102 may not be required. Moreover, the bearing member 96 and 98 need not have rectilinear cross sections and, in at least some embodiments loess than three slots may be required in each of the coupler members. Furthermore, in some embodiments the lateral members 88a and 88b may be integrally formed with plates 84 and bar 14. In addition, in some embodiments where a sufficient horizontal compression force can be provided between bearing members 96 and 98 it may not be necessary to apply vertically aligned force components along the third and fourth trajectories. This is particularly true where the main hopper is relatively heavy so that the hopper weight itself acts to restrain vertical hopper movement above the support members 100 and 102.

Moreover, referring again to FIGS. 11 and 16, embodiments are contemplated where members 96 and 98 only apply forces having vertical components along fourth trajectory T4 and that are essentially void of components along the first and second trajectories T1 and T2, respectively. Here, it is recognized that the first and second trajectory force components T1a and T2a applied by members 96 and 98 alone can restrain side to side motion.

Furthermore, the invention also contemplates embodiments where the support and bearing members 96, 98, 100 and 102 do not extend the entire length of the hopper undersurface. Moreover, while only a single adjustable bearing member 96 is described above embodiments are contemplated that include two or more adjustable bearing members (e.g., member 98 may be adjustable) that can be used to accommodate even larger hopper dimension variances. In addition, while slot shaped apertures are described above, other aperture sizes and shapes are contemplated wherein at least the apertures formed by ends 92 or the apertures formed by coupler members 94a, 94b each have a cross section that is greater than the cross sections of corresponding bolt shafts received therethrough so that movement of an associated bearing member 96 along at least one direction is facilitated. Moreover, where two adjustable bearing members are provided (e.g., where both members 94a and 94b are adjustable) one of the members may be vertically adjustable and the other may be horizontally adjustable.

To apprise the public of the scope of this invention, the following claims are made:

What is claimed is:

1. A hopper support assembly configured to secure one or more hoppers to an agricultural implement, the hopper support assembly comprising:
   a cradle assembly configured to receive the hopper, the cradle assembly including a first lateral member, a second lateral member, and a plurality of elongated bearing members extending therebetween,
   the plurality of elongated bearing members including a first elongated bearing member and a second elongated bearing member coupled at opposing ends of the first and second lateral members, and a third elongated support member; and
   a lockdown assembly having an elongated lockdown bearing member configured to adjustably couple in a plurality of positions between the first and second lateral members of the cradle assembly, the elongated lockdown bearing member and the third elongated support member disposed at opposing ends of the first and second lateral members,
   wherein the elongated lockdown bearing member is configured to engage the hopper in more than one direction in securing the hopper to the cradle assembly.

2. A method of securing a hopper to a cradle assembly, the method comprising the acts of:
   providing a cradle assembly having a plurality of elongated bearing members configured to engage the hopper along the lengths of the elongated bearing members, each of the elongated bearing members coupled between a pair of lateral members;
   receiving the hopper in the cradle assembly;
   providing an elongated lockdown member in parallel relative to the elongated supports of the cradle assembly, each end of the elongated lockdown member coupled to a restraining assembly configured to adjustably couple the elongated lockdown member in a plurality of positions relative to the hopper;
   adjusting a position of the pair of restraining assemblies coupling the elongated lockdown member to the cradle assembly;
   engaging the elongated lockdown member with the hopper in more than one direction in securing the hopper to the cradle assembly; and
   securing a position of each restraining assembly relative to the cradle assembly.

3. An apparatus for use with a planting assembly including a mounting member and a hopper, the hopper including first and second wall members that form first and second hopper external surfaces wherein first and second forces applied perpendicular to the first and second surfaces include at least components along first and second opposing trajectories, respectively, the apparatus for securing the hopper to the mounting member and comprising:
   a first rigid elongated bearing member linked to the mounting member and forming a first bearing surface that applies a first applied force to the first hopper surface wherein the first applied force includes at least a first compressing component along the first trajectory;
   a second rigid elongated bearing member forming a second bearing surface and having a first end; and
   a retainer linked to the first end of the second bearing member and rigidly linking the second bearing member to the mounting member in any of several different positions relative to the first bearing member so that the second bearing surface applies a second applied force to the second hopper surface, the second applied force including at least a second compressing component along the second trajectory, wherein the retainer includes first and second coupler members and a retaining member, the first coupler member rigidly linked to the mounting member and including a first coupler surface that defines a plane that is substantially perpendicular to the first bearing surface, the second coupler member including a second coupler surface and rigidly secured to the first end of the second bearing surface, the retaining member for securing the second coupler surface parallel to and in any of several different positions with respect to the first coupler surface,
   wherein the first and second coupler members form first and second coupler apertures and the retaining member is receivable through the first and second coupler apertures to lock the first and second coupler members in at least one of the several different positions,
wherein each of the coupler apertures is a slot having a slot length, and
wherein the first coupler member slot lengths are parallel and the second coupler slot lengths are parallel and are perpendicular to the first coupler member slot lengths.

4. The apparatus of claim 3, wherein the retaining member is a bolt and a nut where the bolt includes a shaft member and the shaft member is received through the apertures and the nut is received on the end of the shaft to lock the first and second coupler members in the at least one position.

5. The apparatus of claim 4 wherein the shaft has a shaft cross section and at least one of the coupler apertures has an aperture cross section that is substantially larger than the shaft cross section.

6. The apparatus of claim 3 wherein one of the first and second slot lengths is substantially parallel to the first trajectory.

7. The apparatus of claim 3 wherein the first and second coupler apertures comprise a first aperture pair and the first and second couplers also form at least a second coupler aperture pair and wherein the apparatus further includes a second retaining member receivable through the second aperture pair.

8. The apparatus of claim 7 wherein each of the retaining members includes a bolt having a shaft and a nut receivable on the shaft, each shaft has a shaft cross section and each of the apertures has a cross sectional area that is substantially greater than the shaft cross section.

9. The apparatus of claim 3 further including a third aperture pair formed by the first and second coupler members.

10. An apparatus for use with a planting assembly including a mounting member and a hopper, the hopper including first and second wall members that form first and second hopper external surfaces wherein first and second forces applied perpendicular to the first and second surfaces include at least components along first and second opposing trajectories, respectively, the apparatus for securing the hopper to the mounting member and comprising:

a first rigid elongated bearing member linked to the mounting member and forming a first bearing surface that applies a first applied force to the first hopper surface wherein the first applied force includes at least a first compressing component along the first trajectory;

a second rigid elongated bearing member forming a second bearing surface and having a first end; and a retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory, wherein each of the first and second forces applied perpendicular to the first and second hopper surfaces further include components along a third trajectory that is perpendicular to the first trajectory, the apparatus also for use with a hopper including a third external surface wherein a third force applied perpendicular to the third surface includes a component along a fourth trajectory that is opposite the third trajectory wherein the first and second bearing members also form third and fourth bearing surfaces, respectively, the first and second applied forces include components along the third trajectory and the third bearing member applies a third applied force to the third hopper surface having a component along the fourth trajectory, wherein the apparatus is for use with a hopper including a fourth external surface wherein a fourth force applied perpendicular to the fourth surface includes a component along the fourth trajectory and the fourth bearing member applies a fourth applied force to the fourth hopper surface having a component along the fourth trajectory.

11. The apparatus of claim 10 wherein the third and fourth applied forces include components along the first and second trajectories, respectively.

12. The apparatus of claim 11 wherein the retainer includes first and second couplers, a bolt having a shaft and a nut, the first and second couplers forming first and second coupler surfaces, respectively, the first coupler mounted to the mounting member such that the first coupler surface defines a plane that is substantially perpendicular to the first bearing surface, the second coupler mounted to the first end of the second bearing member, the first and second couplers forming first and second slots having first and second slot lengths, respectively, the bolt received through the first and second slots and the nut received on the shaft to secure the second surface in any of several different positions with respect to the first plate.

13. The apparatus of claim 12 further including second and third bolts and corresponding nuts wherein the first and second couplers each form three slots, the first coupler slots parallel, the second coupler slots parallel and perpendicular to the first coupler slots, a separate one of the bolt shafts received through separate pairs of the first and second slots and a separate one of the nuts received on a separate one of the shafts to lock the first and second coupler surfaces in any of several different positions.

14. The apparatus of claim 10 wherein the hopper includes a base member that opens concavely upward and wherein the base member forms each of the first, second, third and fourth hopper surfaces.

15. An apparatus for use with a planting assembly including a mounting member and a hopper, the hopper including first and second wall members that form first and second hopper external surfaces wherein first and second forces applied perpendicular to the first and second surfaces include at least components along first and second opposing trajectories, respectively, the apparatus for securing the hopper to the mounting member and comprising:

a first rigid elongated bearing member linked to the mounting member and forming a first bearing surface that applies a first applied force to the first hopper surface wherein the first applied force includes at least a first compressing component along the first trajectory;

a second rigid elongated bearing member forming a second bearing surface and having a first end;

a first retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory;

a first lateral support member and a second lateral support member linked to the mounting member and forming support surfaces that reside below the hopper for supporting the hopper with the first bearing surface proximate the first hopper surface; and a second retainer, the lateral support member including proximal and distal ends and mounted at a proximal end to the second end of the mounting member, the first and second bearing members each including second ends opposite the first ends where the second end of the first bearing member is integrally mounted to the proximal end of the second lateral support member and the second retainer securing the second end of the second bearing member to the distal end of the second lateral support, wherein the mounting member includes first and second opposite ends, the lateral support member is a first lateral support member mounted to the first end of the mounting member, wherein each of the first and second forces applied perpendicular to the first and second hopper surfaces further include components along a third trajectory that is perpendicular to the first trajectory, wherein the apparatus is for use with a hopper including third and fourth external surfaces wherein third and fourth forces applied perpendicular to the third and fourth surfaces include components along the first and second trajectories, respectively and each also includes a component along a fourth trajectory that is opposite the third trajectory wherein the first and second bearing members also form third and fourth bearing surfaces, respectively, the first and second applied forces include components along the third trajectory, the third bearing member applies a third applied force to the third hopper surface having components along each of the first and fourth trajectories and the fourth bearing member applies a fourth applied force to the fourth hopper surface having components along each of the second and fourth trajectories, and wherein the distal ends of the first and second lateral support members each form a first coupler member including a first coupler surface, each of the retainers includes a second coupler member forming a second coupler surface, a bolt having a shaft and a nut, each first coupler surface defining a plane that is substantially perpendicular to the first bearing surface, the second couplers mounted to opposite ends of the second bearing member, each of the first couplers forming a first slot having a first slot length and each of the second couplers forming a second slot having a second slot length, the first slot lengths substantially parallel, the second slot lengths substantially parallel and perpendicular to the first slot lengths, each bolt shaft received through a respective first and second slots wherein a separate nut is received on each shaft to secure the first and second couplers in any of several different positions.

16. The apparatus of claim 15 wherein the first and second support members are juxtaposed vertically below and between the first and second bearing members.

17. The apparatus of claim 15 wherein each of the first and second forces applied perpendicular to the first and second hopper surfaces further include components along a third trajectory that is perpendicular to the first trajectory, the apparatus also for use with a hopper including third and fourth external surfaces wherein third and fourth forces applied perpendicular to the third and fourth surfaces include components along the first and second trajectories, respectively and each also includes a component along a fourth trajectory that is opposite the third trajectory wherein the first and second bearing members also form third and fourth bearing surfaces, respectively, the first and second applied forces include components along the third trajectory, the third bearing member applies a third applied force to the third hopper surface having components along each of the first and fourth trajectories and the fourth bearing member applies a fourth applied force to the fourth hopper surface having components along each of the second and fourth trajectories.

18. The apparatus of claim 15 further including second and third bolts and corresponding nuts wherein the first and second couplers each form three slots, the first coupler slots parallel, the second coupler slots parallel and perpendicular to the first coupler slots, a separate one of the bolt shafts received through separate pairs of the first and second slots and a separate one of the nuts received on a separate one of the shafts to lock the first and second coupler surfaces in any of several different positions.

19. The apparatus of claim 18 wherein the hopper includes a base member that opens concavely upward and a cover member that covers the concave base member opening wherein the base member forms each of the first, second, third and fourth hopper surfaces.

20. An apparatus for use with a planting assembly including a mounting member, the apparatus for storing particulate, the apparatus comprising:

a hopper including first and second wall members that form first and second hopper external surfaces wherein first and second forces applied perpendicular to the first and second surfaces include at least components along first and second opposing trajectories, respectively;

a first elongated bearing member rigidly linked to the mounting member and forming a first bearing surface that applies a first applied force to the first hopper surface wherein the first applied force includes at least a first compressing component along the first trajectory;

a second elongated bearing member forming a second bearing surface and having a first end;

a retainer linked to the first end of the second bearing member and rigidly linking the second bearing member to the mounting member in any of several different positions relative to the first bearing member so that the second bearing surface applies a second applied force to the second hopper surface wherein the second applied force includes at least a second compressing component along the second trajectory, wherein the mounting member includes first and second ends; and a first lateral support member and a second lateral support member, each lateral support member extending from a proximal end to a distal end, the first and second lateral support members mounted at their proximal ends to the first and second ends of the mounting member, respectively, wherein the first bearing member traverses the distance between the proximal ends of the lateral support members and the retainer links opposite ends of the second bearing member to the distal ends of the lateral support members in any of several different positions such that the second bearing member is substantially parallel to the first bearing member, wherein the retainer includes first and second coupler members that form first and second coupler apertures, respectively, wherein each of the first and second coupler apertures are slot-shaped and having a slot-length, and wherein the first coupler member slot lengths are parallel and the second coupler slot lengths are parallel and are perpendicular to the first coupler member slot lengths.

21. An apparatus for use with a planter assembly including a mounting member, the apparatus for storing particulate and comprising:

first and second elongated lateral support members that extend between proximal and distal ends, are mounted at proximal ends to opposite ends of the mounting member and that extend substantially in parallel and in the same direction from the mounting member to the distal ends;

a first elongated bearing member that traverses the distance between and is integrally mounted to the proximal ends;

a second elongated bearing member having first and second opposite ends;

a hopper having a base member that forms an upwardly concave particulate cavity, the hopper including generally oppositely facing first and second surfaces that form oppositely facing first and second elongated recesses, respectively, the hopper positioned such that the first bearing member is received in the first recess;

a first retainer and a second retainer for securing the first and second ends of the second elongated bearing member to the distal ends of the lateral support members in any of several different positions, respectively, wherein the first and second retainers are secured to the distal ends with the second bearing member received within the second recess, wherein each of the first and second retainers include first and second coupler members that form first and second coupler apertures, respectively, wherein each of the first and second coupler apertures are slot-shaped and having a slot-length, and wherein the first coupler member slot lengths are parallel and the second coupler slot lengths are parallel and are perpendicular to the first coupler member slot lengths.

* * * * *